United States Patent
Nagalla et al.

(10) Patent No.: US 9,885,559 B2
(45) Date of Patent: *Feb. 6, 2018

(54) METHOD AND APPARATUS FOR FOLLOWING AN OPERATOR AND LOCKING ONTO A RETROREFLECTOR WITH A LASER TRACKER

(71) Applicant: FARO Technologies, Inc., Lake Mary, FL (US)

(72) Inventors: Kalyan Nagalla, Downingtown, PA (US); Robert C. Mehler, Coatesville, PA (US); Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/450,200

(22) Filed: Mar. 6, 2017

(65) Prior Publication Data

US 2017/0176169 A1 Jun. 22, 2017

Related U.S. Application Data

(60) Continuation of application No. 15/055,699, filed on Feb. 29, 2016, now Pat. No. 9,772,394, which is a
(Continued)

(51) Int. Cl.
*G01B 11/14* (2006.01)
*G01B 11/00* (2006.01)
(Continued)

(52) U.S. Cl.
CPC ............ *G01B 11/002* (2013.01); *G01S 3/786* (2013.01); *G01S 17/023* (2013.01); *G01S 17/06* (2013.01);
(Continued)

(58) Field of Classification Search
CPC ....................................................... G01B 11/14
(Continued)

(56) References Cited

U.S. PATENT DOCUMENTS

| 4,983,021 A | 1/1991 | Fergason |
| 5,137,354 A | 8/1992 | Devos et al. |

(Continued)

FOREIGN PATENT DOCUMENTS

| AT | 501507 A1 | 9/2006 |
| AT | 506110 A1 | 6/2009 |

(Continued)

OTHER PUBLICATIONS

Cao, et al.; "VisionWand: Interaction Techniques for Large Displays using a Passive Wand Tracked in 3D"; Proceedings of the 16th Annual ACM Symposium on User Interface Software and Technology, UIST; vol. 5, issue 2; pp. 173-182; Jan. 2003.
(Continued)

*Primary Examiner* — Roy M Punnoose
(74) *Attorney, Agent, or Firm* — Cantor Colburn LLP

(57) ABSTRACT

A method for measuring three-dimensional (3D) coordinates includes providing a retroreflector and a laser tracker. In a first instance, an operator gives a follow-operator command. The laser tracker responds by following movement of the operator. In a second instance, the operator gives a lock-on command. The laser tracker responds by steering a beam of light onto the retroreflector.

20 Claims, 31 Drawing Sheets

Related U.S. Application Data continuation-in-part of application No. 14/531,113, filed on Nov. 3, 2014, now Pat. No. 9,377,885, which is a continuation-in-part of application No. 14/180,900, filed on Feb. 14, 2014, now Pat. No. 8,896,848, which is a division of application No. 13/803,479, filed on Mar. 14, 2013, now Pat. No. 8,654,355, which is a division of application No. 13/090,889, filed on Apr. 20, 2011, now Pat. No. 8,422,034.

(60) Provisional application No. 61/326,294, filed on Apr. 21, 2010.

(51) Int. Cl.
| | |
|---|---|
| *G01S 17/02* | (2006.01) |
| *G01S 17/06* | (2006.01) |
| *G01S 17/66* | (2006.01) |
| *G01S 3/786* | (2006.01) |
| *G06F 3/01* | (2006.01) |
| *G06F 3/042* | (2006.01) |

(52) U.S. Cl.
CPC .............. *G01S 17/66* (2013.01); *G06F 3/017* (2013.01); *G06F 3/0421* (2013.01); *G06F 3/0425* (2013.01)

(58) Field of Classification Search
USPC .......... 356/4.01, 138, 139.03, 139.04, 141.1, 356/141.2, 141.5, 152.3, 154, 498, 614, 356/620, 622, 623; 702/150, 151, 152, 702/153
See application file for complete search history.

(56) References Cited

U.S. PATENT DOCUMENTS

| | | | |
|---|---|---|---|
| 5,313,409 A | 5/1994 | Wiklund et al. | |
| 5,347,306 A | 9/1994 | Nitta | |
| 5,402,582 A | 4/1995 | Raab | |
| 5,532,816 A | 7/1996 | Spann et al. | |
| 5,611,147 A | 3/1997 | Raab | |
| 5,767,952 A | 6/1998 | Ohtomo et al. | |
| 5,973,788 A | 10/1999 | Pettersen et al. | |
| 6,034,722 A | 3/2000 | Viney et al. | |
| 6,171,018 B1 | 1/2001 | Ohtomo et al. | |
| 6,222,465 B1 | 4/2001 | Kumar et al. | |
| 6,433,866 B1 | 8/2002 | Nichols | |
| 6,573,883 B1 | 6/2003 | Bartlett | |
| 6,646,732 B2 | 11/2003 | Ohtomo et al. | |
| 6,681,031 B2 | 1/2004 | Cohen et al. | |
| 6,847,436 B2 | 1/2005 | Bridges | |
| 6,980,881 B2 | 12/2005 | Greenwood et al. | |
| 7,129,927 B2 | 10/2006 | Mattsson | |
| 7,327,446 B2 | 2/2008 | Cramer et al. | |
| 7,353,954 B1 | 4/2008 | Malek et al. | |
| 7,388,658 B2 | 6/2008 | Glimm | |
| 7,401,783 B2 | 7/2008 | Pryor | |
| 7,466,401 B2 | 12/2008 | Cramer et al. | |
| 7,583,375 B2 | 9/2009 | Cramer et al. | |
| 8,320,708 B2 | 11/2012 | Kurzweil et al. | |
| 8,379,224 B1 | 2/2013 | Piasse et al. | |
| 8,422,034 B2* | 4/2013 | Steffensen ........... | G01C 15/002 356/614 |
| 8,437,011 B2* | 5/2013 | Steffensen ........... | G01C 15/002 356/614 |
| 8,467,072 B2* | 6/2013 | Cramer ................. | G01B 11/03 356/614 |
| 8,537,371 B2 | 9/2013 | Steffensen et al. | |
| 8,537,375 B2* | 9/2013 | Steffensen ........... | G01C 15/002 356/614 |
| 8,654,354 B2* | 2/2014 | Steffensen ........... | G01C 15/002 356/614 |
| 9,234,742 B2* | 1/2016 | Bridges ................ | G01B 11/002 |
| 9,377,885 B2* | 6/2016 | Bridges ................ | G01B 21/047 |
| 9,664,508 B2 | 5/2017 | McAfee et al. | |
| 2002/0179866 A1 | 12/2002 | Hoeller et al. | |
| 2003/0014212 A1 | 1/2003 | Ralston et al. | |
| 2003/0125901 A1 | 7/2003 | Steffey et al. | |
| 2006/0262001 A1 | 11/2006 | Ouchi et al. | |
| 2007/0019212 A1 | 1/2007 | Gatsios et al. | |
| 2008/0201101 A1 | 8/2008 | Hebert et al. | |
| 2008/0309949 A1 | 12/2008 | Rueb | |
| 2009/0244277 A1 | 10/2009 | Nagashima et al. | |
| 2010/0046005 A1 | 2/2010 | Kalkowski | |
| 2010/0074532 A1 | 3/2010 | Gordon et al. | |
| 2010/0091112 A1 | 4/2010 | Veeser et al. | |
| 2010/0128259 A1 | 5/2010 | Bridges et al. | |
| 2011/0043620 A1 | 2/2011 | Svanholm et al. | |
| 2011/0107611 A1 | 5/2011 | Desforges et al. | |
| 2011/0107613 A1 | 5/2011 | Tait | |
| 2011/0260033 A1* | 10/2011 | Steffensen .......... | G01C 15/002 250/203.1 |
| 2011/0282622 A1 | 11/2011 | Canter | |
| 2011/0288684 A1 | 11/2011 | Farlow et al. | |
| 2011/0316978 A1 | 12/2011 | Dillon et al. | |
| 2012/0194644 A1 | 8/2012 | Newcombe et al. | |
| 2013/0037694 A1* | 2/2013 | Steffensen .......... | G01C 15/002 250/203.2 |
| 2014/0320643 A1 | 10/2014 | Markendorf | |
| 2014/0327920 A1 | 11/2014 | Bridges et al. | |
| 2015/0049329 A1 | 2/2015 | Bridges et al. | |
| 2016/0178348 A1* | 6/2016 | Nagalla ................. | G06F 3/017 250/203.2 |
| 2016/0377410 A1 | 12/2016 | Becker et al. | |

FOREIGN PATENT DOCUMENTS

| | | |
|---|---|---|
| CN | 1846148 A | 10/2006 |
| CN | 101556137 A | 10/2009 |
| CN | 101776982 A | 7/2010 |
| CN | 101806574 A | 8/2010 |
| DE | 102004052199 A1 | 4/2006 |
| DE | 102006049695 A1 | 4/2008 |
| DE | 202008013217 A1 | 5/2009 |
| DE | 102009035336 A1 | 11/2010 |
| DE | 112009001652 A1 | 1/2012 |
| EP | 0797076 A2 | 9/1997 |
| EP | 0919831 A2 | 6/1999 |
| EP | 1211481 A1 | 6/2002 |
| EP | 1681533 A1 | 7/2006 |
| EP | 2071283 A2 | 6/2009 |
| EP | 2400379 A1 | 12/2011 |
| JP | H0665818 | 9/1994 |
| JP | H06241779 A | 9/1994 |
| JP | H11304465 A | 11/1999 |
| JP | 2001013247 A | 1/2001 |
| JP | 2001033250 A | 2/2001 |
| JP | 2003506691 A | 2/2003 |
| JP | 2004108939 A | 4/2004 |
| JP | 2006220514 A | 8/2006 |
| JP | 2006276012 A | 10/2006 |
| JP | 2006526844 A | 11/2006 |
| JP | 2008514967 A | 5/2008 |
| JP | 2009134761 A | 6/2009 |
| JP | 2009523236 A | 6/2009 |
| JP | 2009229350 A | 10/2009 |
| JP | 2011526706 A | 10/2011 |
| JP | H04504468 A | 10/2011 |
| JP | 2012225869 A | 11/2012 |
| WO | 9534849 A1 | 12/1995 |
| WO | 0237466 A1 | 5/2002 |
| WO | 03073121 A1 | 9/2003 |
| WO | 2009106141 A1 | 9/2009 |
| WO | 2011133731 A2 | 10/2011 |
| WO | 2011134083 A1 | 11/2011 |
| WO | 2011160962 A1 | 12/2011 |

OTHER PUBLICATIONS

International Search Report and the Written Opinion of the International Searching Authority for Application No. PCT/US2012/

(56) References Cited

OTHER PUBLICATIONS 070283, which is related to U.S. Appl. No. 15/450,200; Date of Completion Mar. 6, 2013; dated Mar. 27, 2013; 10 pages.
International Search Report and the Written Opinion of the International Searching Authority for Application No. PCT/US2015/056829, which is related to U.S. Appl. No. 15/450,200; Date of Completion Jan. 26, 2016; dated Feb. 1, 2016; 18 pages.
International Search Report and Written Opinion of the International Searching Authority for Application No. PCT/US2011/033360, which is related to U.S. Appl. No. 15/450,200; Date of Completion Feb. 23, 2012; dated Feb. 29, 2012; 28 pages.
International Search Report and Written Opinion of the International Searching Authority for Application No. PCT/US2016/063457, which is related to U.S. Appl. No. 15/450,200; Date of Completion Feb. 22, 2017; dated Mar. 2, 2017; 13 pages.
Li, et al., "Real Time Hand Gesture Recognition using a Range Camera", Australasian Conference on Robotics and Automation (ACRA), [Retrieved Aug. 10, 2011, http://www.araa.asn.au/acra/acra2009/papers/pap128s1.pdf] pp. 1-7 (2009).
TOPCON: "IS-3 Imaging Station"; www.topconposition.com; 2011; 1-4 pages.
Turk, et al., "Perceptual Interfaces", UCSB Technical Report 2003-33, pp. 1-43 [Retreived Aug. 11, 2011, http://www.cs.ucsb.edu/research/tech_reports/reports/2003-33.pdf] (2003).
Brenneke et al: "Using 3D laser range data for slam in outdoor enviornments." Proceedings of the 2003 IEEE/RSJ International Conference on Intelligent Robots and Systems. Las Vegas, NV Oct. 27-31, 2003; IEEE US, vol. 1, Oct. 27, 2003, pp. 188-193.
Dipl. Ing. Karl Zeiske; : "Vermessen Leicht Gemacht"; Leica Geosystems AG, Heerbrugg, Switzerland, 2000; pp. 1-39; www.leica-geosystems.com—English Translation Attached.

Gebre, et al. "Remotely Operated and Autonomous Mapping System (ROAMS)." Technologies for Practical Robot Applications, 2009. Tepra 2009. IEEE International Conference on IEEE, Piscataway, NJ, USA. Nov. 9, 2009, pp. 173-178.
Granstrom, Karl, M et al: "Learning to Close the Loop from 3-D Point Clouds." 2010 IEEE/RSJ International Conference on Intelligent Robots and Systems (IROS), Piscataway, NJ, Oct. 18, 2010, pp. 1-7.
Hebert P., "A self-referenced hand-held range sensor", 3-D Digital Imaging and Modeling, 2001, Proceedings, Third anual International Conference on May 28-Jun. 1, 2001, Piscataway, NJ, USA, IEEE, May 28, 2001, pp. 5-12.
Henry, P., et al: "RGB-D Mapping; Using Kinnect-style Depth Cameras for Dense 3-D Modeling of Indoor Enviornments." The International Journal of Robitcs Research, vol. 31, No. 5, Feb. 10, 2012, pp. 647-663.
Lee, Wonwoo, et al.:"Panoramic Mesh Model Generation From Multiple Range Data for Indoor Screen Reconstruction." Advances in Multimedia Information Processing, PCM Lecture Notes in Computer Science, Jan. 1, 2005, Berlin, DE, pp. 1004-1014.
Leica Geosystems: "TPS1100 Professional Series", 1999, Retrieved from the Internet: URL:http://www.estig.ipbeja.pt/~legvm/top_civil/TPS1100%20-%20A%20New%20Generation%20of%20Total%20Stations.pdf, [Retrieved on Jul. 2012] the whole document.
May S. et al; "Robust 3-D Mapping with time-of-flight cameras." Intelligent Robots and Systems, IRIS 2009. IEEE/RSJ Internation Conference. Piscataway, NJ Oct. 10, 2009, pp. 1-6.
Surmann et al. "An autonomous mobile robot with a 3D laser range finder for 3D exploration and digitalization of indoor enviornments." Robotics and Autonomous Systems vol. 45 No. 3-4, Dec. 31, 2003, pp. 181-198. Amsterdamn, Netherlands.
Weise, Thibaut, et al.:"Online Loop Closure for real-time interactive 3-D scanning." Computer Vision and Image Understanding, vol. 115, No. 5, May 1, 2011, pp. 635-648.

\* cited by examiner

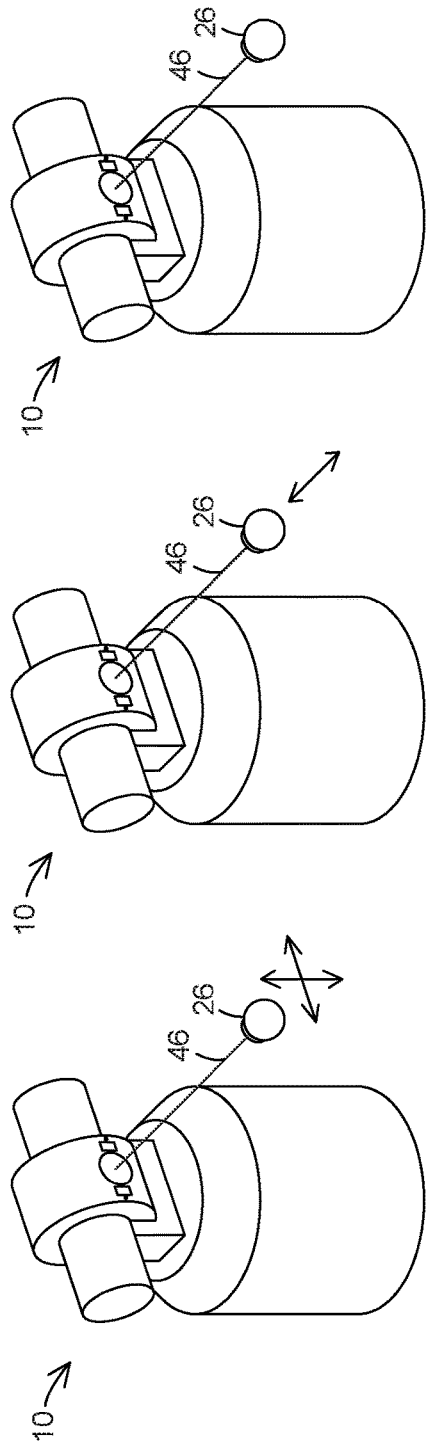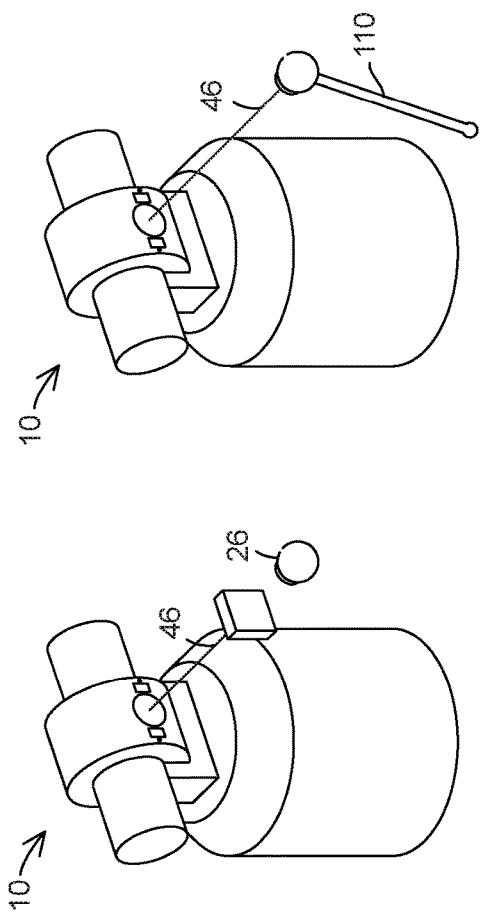

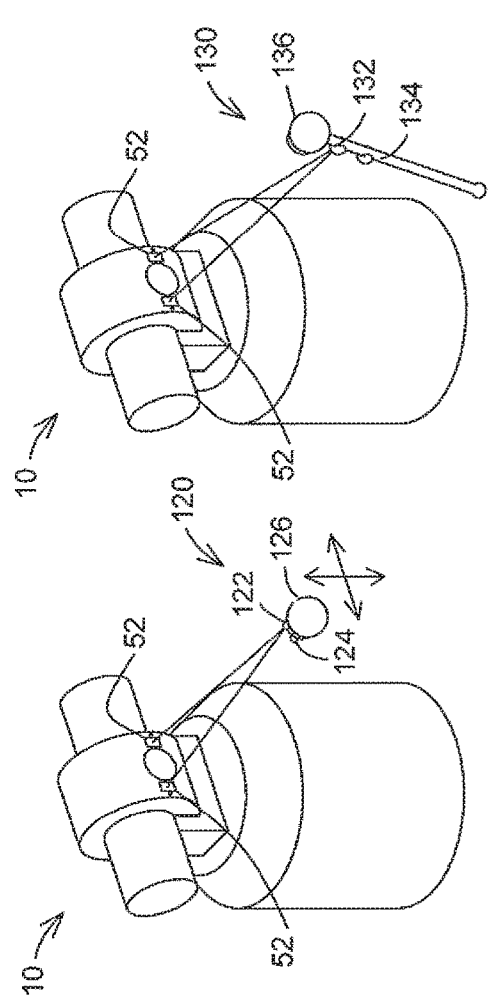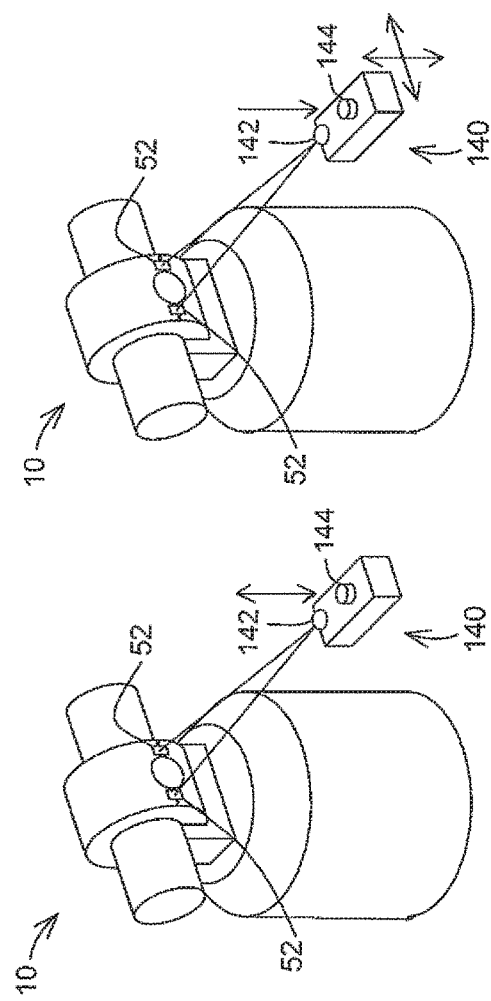

| Command | Software shortcut | Example 1 gesture | Example 2 gesture |
|---|---|---|---|
| Cancel | Esc |  | |
| Measure a Comp Off Point | F2 |  | |
| Measure a Comp Axis Point | ! |  | |
| Measure a Plane | F3 |  | 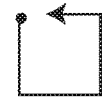 |
| Measure a 2D Line | F4 |  |  |
| Measure a Circle | F10 |  |  |
| Measure a Cylinder | F8 |  |  |
| Measure a Sphere | F12 |  |  |
| Change SMR | P |  |  |
| Reset Interferometer | T |  | |
FIGURE 8

| Command | Software shortcut | Example 1 gesture | Example 2 gesture |
|---|---|---|---|
| Set Distance Mode | N |  |  |
| Search | S |  |  |
| Toggle Single Point/ Scan Modes | X |  |  |
| Material Thickness | M |  |  |
| Collect Reading | Insert |  |  |
| Compensation Point | Home |  |  |
| Remove Reading | ← |  | |
| Autoadjust Using SMR | N/A |  |  |
| Autoadjust Using Internal Retroreflector | N/A |  |  |
| Initialize Command Tablet | N/A |  | |
FIGURE 9

| Command | Software shortcut | Example 1 gesture |
|---|---|---|
| Set Reference Point | N/A | 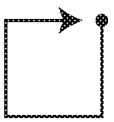 |
| User Defined 1 | N/A | 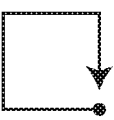 |
| User Defined 2 | N/A | 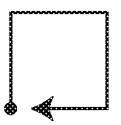 |
| User Defined 3 | N/A | 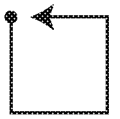 |
| User Defined 4 | N/A | 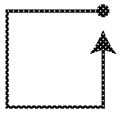 |
| User Defined 5 | N/A | 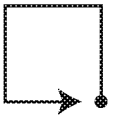 |
| User Defined 6 | N/A | 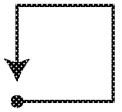 |
| Acquire SMR | N/A |  |
FIGURE 10

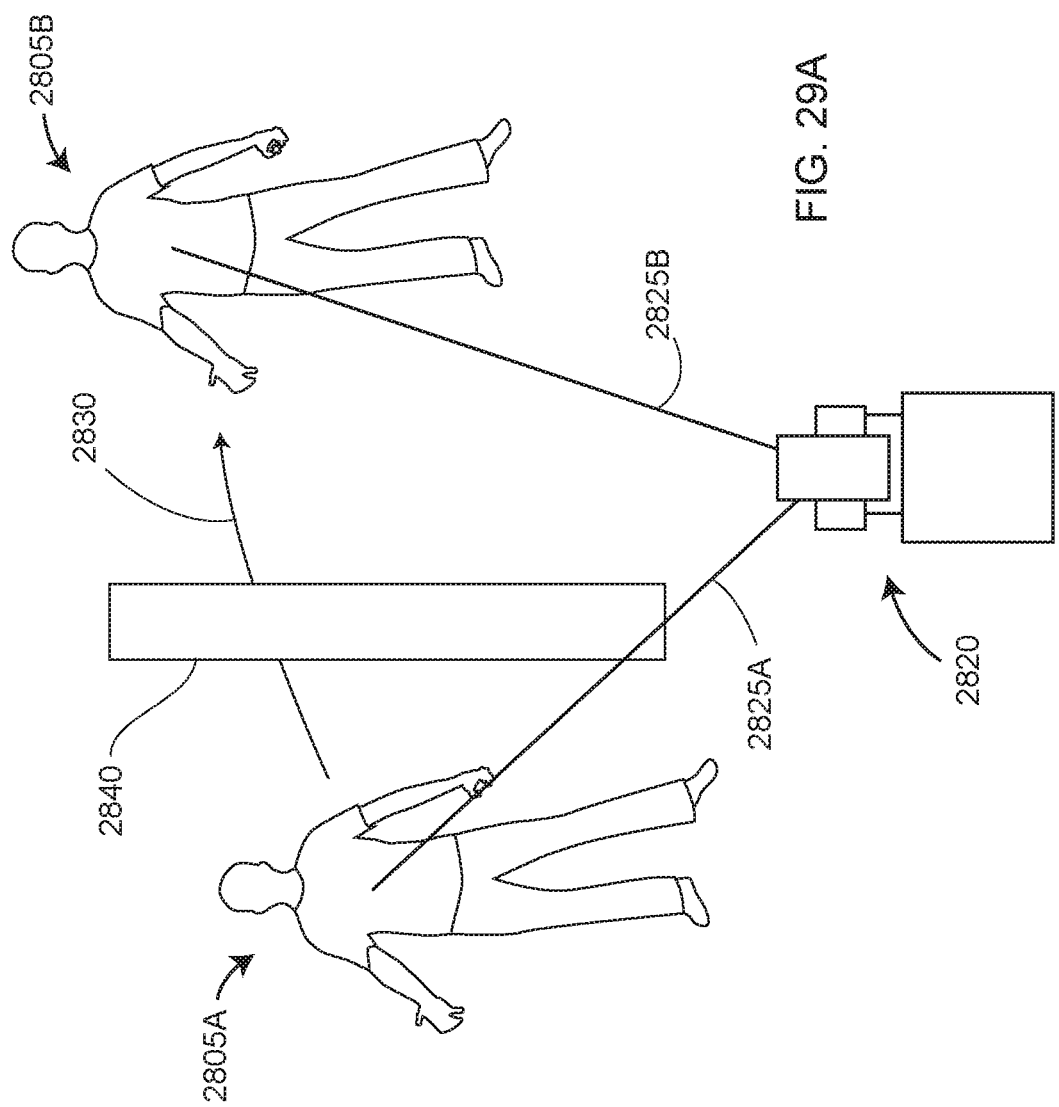

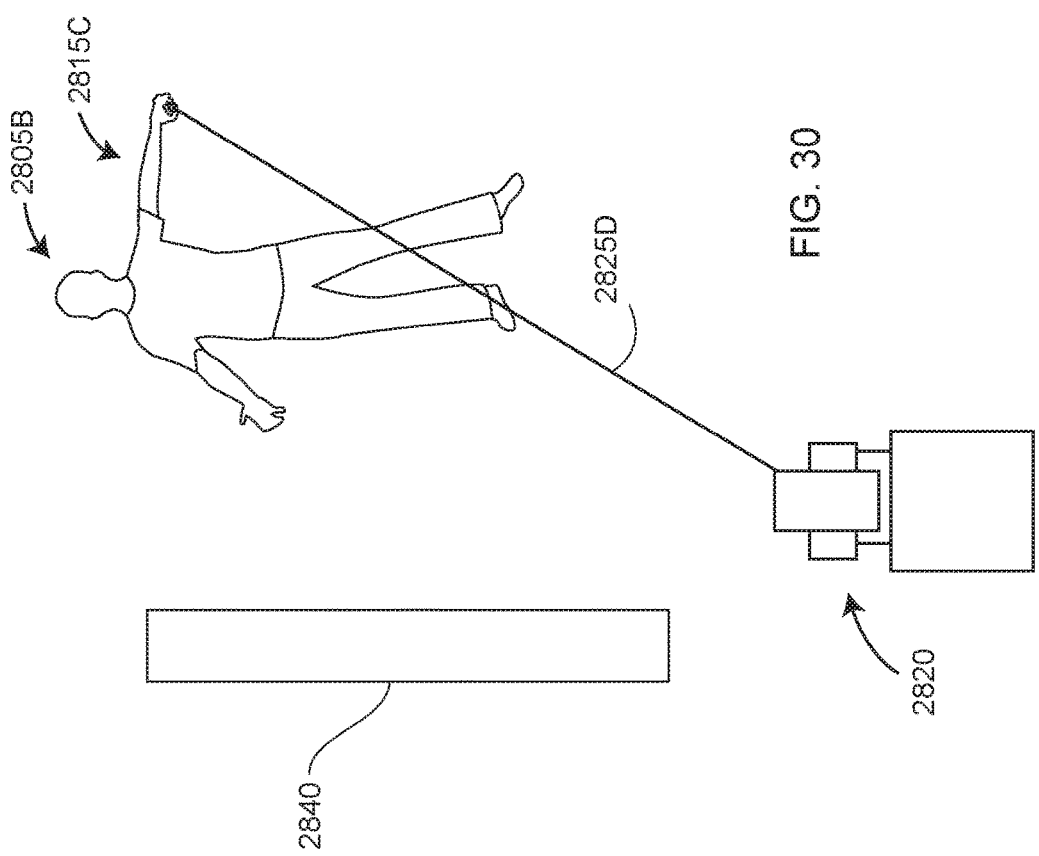

METHOD AND APPARATUS FOR FOLLOWING AN OPERATOR AND LOCKING ONTO A RETROREFLECTOR WITH A LASER TRACKER

CROSS REFERENCE TO RELATED APPLICATIONS

This application is a continuation of U.S. application Ser. No. 15/055,699, filed Feb. 29, 2016, which is a continuation-in-part of U.S. application Ser. No. 14/531,113, filed Nov. 3, 2014, which is a continuation-in-part of U.S. application Ser. No. 14/180,900, filed 14 Feb. 2014, which is a divisional of Ser. No. 13/803,479, filed on Mar. 14, 2013. U.S. application Ser. No. 13/803,479 is a divisional application of U.S. patent application Ser. No. 13/090,889, filed on Apr. 20, 2011, which claims the benefit of U.S. Provisional Application No. 61/326,294, filed on Apr. 21, 2010, the entire contents of which are incorporated herein by reference.

BACKGROUND

The present disclosure relates to a coordinate measuring device. One set of coordinate measurement devices belongs to a class of instruments that measure the three-dimensional (3D) coordinates of a point by sending a laser beam to the point, where it is intercepted by a retroreflector target. The instrument finds the coordinates of the point by measuring the distance and the two angles to the target. The distance is measured with a distance-measuring device such as an absolute distance meter (ADM) or an interferometer. The angles are measured with an angle-measuring device such as an angular encoder. A gimbaled beam-steering mechanism within the instrument directs the laser beam to the point of interest. An example of such a device is a laser tracker. Exemplary laser tracker systems are described by U.S. Pat. No. 4,790,651 to Brown et al., incorporated by reference herein, and U.S. Pat. No. 4,714,339 to Lau et al.

A coordinate-measuring device closely related to the laser tracker is the total station. The total station, which is most often used in surveying applications, may be used to measure the coordinates of diffusely scattering or retroreflective targets. Hereinafter, the term laser tracker is used in a broad sense to include total stations.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The apex of the cube corner, which is the common point of intersection of the three mirrors, is located at the center of the sphere. It is common practice to place the spherical surface of the SMR in contact with an object under test and then move the SMR over the surface being measured. Because of this placement of the cube corner within the sphere, the perpendicular distance from the apex of the cube corner to the surface of the object under test remains constant despite rotation of the SMR. Consequently, the 3D coordinates of a surface can be found by having a tracker follow the 3D coordinates of an SMR moved over the surface. It is possible to place a glass window on the top of the SMR to prevent dust or dirt from contaminating the glass surfaces. An example of such a glass surface is shown in U.S. Pat. No. 7,388,654 to Raab et al., incorporated by reference herein.

A gimbal mechanism within the laser tracker may be used to direct a laser beam from the tracker to the SMR. Part of the light retroreflected by the SMR enters the laser tracker and passes onto a position detector. The position of the light that hits the position detector is used by a tracker control system to adjust the rotation angles of the mechanical azimuth and zenith axes of the laser tracker to keep the laser beam centered on the SMR. In this way, the tracker is able to follow (track) the SMR.

Angular encoders attached to the mechanical azimuth and zenith axes of the tracker may measure the azimuth and zenith angles of the laser beam (with respect to the tracker frame of reference). The one distance measurement and two angle measurements performed by the laser tracker are sufficient to completely specify the three-dimensional location of the SMR.

As mentioned previously, two types of distance meters may be found in laser trackers: interferometers and absolute distance meters (ADMs). In the laser tracker, an interferometer (if present) may determine the distance from a starting point to a finishing point by counting the number of increments of known length (usually the half-wavelength of the laser light) that pass as a retroreflector target is moved between the two points. If the beam is broken during the measurement, the number of counts cannot be accurately known, causing the distance information to be lost. By comparison, the ADM in a laser tracker determines the absolute distance to a retroreflector target without regard to beam breaks, which also allows switching between targets. Because of this, the ADM is said to be capable of "point-and-shoot" measurement. Initially, absolute distance meters were only able to measure stationary targets and for this reason were always used together with an interferometer. However, some modern absolute distance meters can make rapid measurements, thereby eliminating the need for an interferometer. Such an ADM is described in U.S. Pat. No. 7,352,446 to Bridges et al., incorporated by reference herein.

In its tracking mode, the laser tracker will automatically follow movements of the SMR when the SMR is in the capture range of the tracker. If the laser beam is broken, tracking will stop. The beam may be broken by any of several means: (1) an obstruction between the instrument and SMR; (2) rapid movements of the SMR that are too fast for the instrument to follow; or (3) the direction of the SMR being turned beyond the acceptance angle of the SMR. By default, following the beam break, the beam remains fixed at the point of the beam break or at the last commanded position. It may be necessary for an operator to visually search for the tracking beam and place the SMR in the beam in order to lock the instrument onto the SMR and continue tracking.

Some laser trackers include one or more cameras. A camera axis may be coaxial with the measurement beam or offset from the measurement beam by a fixed distance or angle. A camera may be used to provide a wide field of view to locate retroreflectors. A modulated light source placed near the camera optical axis may illuminate retroreflectors, thereby making them easier to identify. In this case, the retroreflectors flash in phase with the illumination, whereas background objects do not. One application for such a camera is to detect multiple retroreflectors in the field of view and measure each in an automated sequence. Exemplary systems are described in U.S. Pat. No. 6,166,809 to Pettersen et al., and U.S. Pat. No. 7,800,758 to Bridges et al., incorporated by reference herein.

Some laser trackers have the ability to measure with six degrees of freedom (DOF), which may include three coordinates, such as x, y, and z, and three rotations, such as pitch, roll, and yaw. Several systems based on laser trackers are available or have been proposed for measuring six degrees of freedom. Exemplary systems are described in U.S. Published Patent Application No. 2010/0128259 to Bridges, incorporated by reference herein; U.S. Pat. No. 7,800,758 to Bridges et al., U.S. Pat. No. 5,973,788 to Pettersen et al.; and U.S. Pat. No. 7,230,689 to Lau.

User Control of Laser Tracker Functionality

Two common modes of operation of the laser tracker are tracking mode and profiling mode. In tracking mode, the laser beam from the tracker follows the retroreflector as the operator moves it around. In profiling mode, the laser beam from the tracker goes in the direction given by the operator, either through computer commands or manual action.

Besides these modes of operation that control the basic tracking and pointing behavior of the tracker, there are also special option modes that enable the tracker to respond in a manner selected by the operator ahead of time. The desired option mode is typically selected in software that controls the laser tracker. Such software may reside in an external computer attached to the tracker (possibly through a network cable) or within the tracker itself. In the latter case, the software may be accessed through console functionality built into the tracker.

An example of an option mode is the Auto Reset mode in which the laser beam is driven to a preset reference point whenever the laser beam is broken. One popular reference point for the Auto Reset option mode is the tracker Home Position, which is the position of a magnetic nest mounted on the tracker body. The alternative to Auto Reset is the No Reset option mode. In this case, the laser beam continues pointing in the original direction whenever the laser beam is broken. A description of the tracker home position is given in U.S. Pat. No. 7,327,446 to Cramer et al., incorporated by reference herein.

Another example of a special option mode is PowerLock, a feature offered by Leica Geosystems on their Leica Absolute Tracker™. In the PowerLock option mode, the location of the retroreflector is found by a tracker camera whenever the tracker laser beam is broken. The camera immediately sends the angular coordinates of the retroreflector to the tracker control system, thereby causing the tracker to point the laser beam back at the retroreflector. Methods involving automatic acquisition of a retroreflector are given in international application WO 2007/079601 to Dold et al. and U.S. Pat. No. 7,055,253 to Kaneko.

Some option modes are slightly more complex in their operation. An example is the Stability Criterion mode, which may be invoked whenever an SMR is stationary for a given period of time. The operator may track an SMR to a magnetic nest and set it down. If a stability criterion is active, the software will begin to look at the stability of the three-dimensional coordinate readings of the tracker. For instance, the user may decide to judge the SMR to be stable if the peak-to-peak deviation in the distance reading of the SMR is less than two micrometers over a one second interval. After the stability criterion is satisfied, the tracker measures the 3D coordinates and the software records the data.

More complex modes of operation are possible through computer programs. For example, software is available to measure part surfaces and fit these to geometrical shapes. Software will instruct the operator to move the SMR over the surface and then, when finished collecting data points, to raise the SMR off the surface of the object to end the measurement. Moving the SMR off the surface not only indicates that the measurement is completed; it also indicates the position of the SMR in relation to the object surface. This position information is needed by the application software to properly account for the offset caused by the SMR radius.

A second example of complex computer control is a tracker survey. In the survey, the tracker is driven sequentially to each of several target locations according to a prearranged schedule. The operator may teach these positions prior to the survey by carrying the SMR to each of the desired positions.

A third example of complex software control is tracker directed measurement. The software directs the operator to move the SMR to a desired location. It does this using a graphic display to show the direction and distance to the desired location. When the operator is at the desired position, the color on the computer monitor might, for example, turn from red to green.

The element common to all tracker actions described above is that the operator is limited in his ability to control the behavior of the tracker. On the one hand, option modes selected in the software may enable the operator to preset certain behaviors of the tracker. However, once the option modes have been selected by the user, the behavior of the tracker is established and cannot be changed unless the operator returns to the computer console. On the other hand, the computer program may direct the operator to carry out complicated operations that the software analyzes in a sophisticated way. In either case, the operator is limited in his ability to control the tracker and the data collected by the tracker.

Need for Remote Tracker Commands

A laser tracker operator performs two fundamental functions. He positions an SMR during a measurement, and he sends commands through the control computer to the tracker. However, it is not easy for one operator to perform both of these measurement functions because the computer is usually far away from the measurement location. Various methods have been tried to get around this limitation, but none is completely satisfactory.

One method sometimes used is for a single operator to set the retroreflector in place and walk back to the instrument control keyboard to execute a measurement instruction. However, this is an inefficient use of operator and instrument time. In cases where the operator must hold the retroreflector for the measurement, single operator control is only possible when the operator is very close to the keyboard.

A second method is to add a second operator. One operator stands by the computer and a second operator moves the SMR. This is obviously an expensive method and verbal communication over large distances can be a problem.

A third method is to equip a laser tracker with a remote control. However, remote controls have several limitations. Many facilities do not allow the use of remote controls for safety or security reasons. Even if remote controls are allowed, interference among wireless channels may be a problem. Some remote control signals do not reach the full range of the laser tracker. In some situations, such as working from a ladder, the second hand may not be free to operate the remote control. Before a remote control can be used, it is usually necessary to set up the computer and remote control to work together, and then only a small subset of tracker commands can ordinarily be accessed at any given time. An example of a system based on this idea is given in U.S. Pat. No. 7,233,316 to Smith et al.

A fourth method is to interface a cell phone to a laser tracker. Commands are entered remotely by calling the instrument from the cell phone and entering numbers from the cell phone keypad or by means of voice recognition. This method also has many shortcomings. Some facilities do not allow cell phones to be used, and cell phones may not be available in rural areas. Service requires a monthly service provider fee. A cell phone interface requires additional hardware interfacing to the computer or laser tracker. Cell phone technology changes fast and may require upgrades. As in the case of remote controls, the computer and remote control must be set up to work together, and only a small subset of tracker commands can ordinarily be accessed at a given time.

A fifth method is to equip a laser tracker with internet or wireless network capabilities and use a wireless portable computer or personal digital assistant (PDA) to communicate commands to the laser tracker. However, this method has limitations similar to a cell phone. This method is often used with total stations. Examples of systems that use this method include U.S. Published Patent Application No. 2009/017618 to Kumagai et al., U.S. Pat. No. 6,034,722 to Viney et al., U.S. Pat. No. 7,423,742 to Gatsios et al., U.S. Pat. No. 7,307,710 to Gatsios et al., U.S. Pat. No. 7,552,539 to Piekutowski, and U.S. Pat. No. 6,133,998 to Monz et al. This method has also been used to control appliances by a method described in U.S. Pat. No. 7,541,965 to Ouchi et al.

A sixth method is to use a pointer to indicate a particular location in which a measurement is to be made. An example of this method is given in U.S. Pat. No. 7,022,971 to Ura et al. It might be possible to adapt this method to give commands to a laser tracker, but it is not usually very easy to find a suitable surface upon which to project the pointer beam pattern.

A seventh method is to devise a complex target structure containing at least a retroreflector, transmitter, and receiver. Such systems may be used with total stations to transmit precise target information to the operator and also to transmit global positioning system (GPS) information to the total station. An example of such a system is given in U.S. Published Patent Application No. 2008/0229592 to Hinderling et al. In this case, no method is provided to enable the operator to send commands to the measurement device (total station).

An eighth method is to devise a complex target structure containing at least a retroreflector, transmitter and receiver, where the transmitter has the ability to send modulated light signals to a total station. A keypad can be used to send commands to the total station by means of the modulated light. These commands are decoded by the total station. Examples of such systems are given in U.S. Pat. No. 6,023,326 to Katayama et al., U.S. Pat. No. 6,462,810 to Muraoka et al., U.S. Pat. No. 6,295,174 to Ishinabe et al., and U.S. Pat. No. 6,587,244 to Ishinabe et al. This method is particularly appropriate for surveying applications in which the complex target and keypad are mounted on a large staff. Such a method is not suitable for use with a laser tracker, where it is advantageous to use a small target not tethered to a large control pad. Also it is desirable to have the ability to send commands even when the tracker is not locked onto a retroreflector target.

A ninth method is to include both a wireless transmitter and a modulated light source on the target to send information to a total station. The wireless transmitter primarily sends information on the angular pose of the target so that the total station can turn in the proper direction to send its laser beam to the target retroreflector. The modulated light source is placed near the retroreflector so that it will be picked up by the detector in the total station. In this way, the operator can be assured that the total station is pointed in the right direction, thereby avoiding false reflections that do not come from the target retroreflector. An exemplary system based on this approach is given in U.S. Pat. No. 5,313,409 to Wiklund et al. This method does not offer the ability to send general purpose commands to a laser tracker.

A tenth method is to include a combination of wireless transmitter, compass assembly in both target and total station, and guide light transmitter. The compass assembly in the target and total station are used to enable alignment of the azimuth angle of the total station to the target. The guide light transmitter is a horizontal fan of light that the target can pan in the vertical direction until a signal is received on the detector within the total station. Once the guide light has been centered on the detector, the total station adjusts its orientation slightly to maximize the retroreflected signal. The wireless transmitter communicates information entered by the operator on a keypad located at the target. An exemplary system based on this method is given in U.S. Pat. No. 7,304,729 to Wasutomi et al. This method does not offer the ability to send general purpose commands to a laser tracker.

An eleventh method is to modify the retroreflector to enable temporal modulation to be imposed on the retroreflected light, thereby transmitting data. The inventive retroreflector comprises a cube corner having a truncated apex, an optical switch attached to the front face of the cube corner, and electronics to transmit or receive data. An exemplary system of this type is given in U.S. Pat. No. 5,121,242 to Kennedy. This type of retroreflector is complex and expensive. It degrades the quality of the retroreflected light because of the switch (which might be a ferro-electric light crystal material) and because of the truncated apex. Also, the light returned to a laser tracker is already modulated for use in measuring the ADM beam, and switching the light on and off would be a problem, not only for the ADM, but also for the tracker interferometer and position detector.

A twelfth method is to use a measuring device that contains a bidirectional transmitter for communicating with a target and an active retroreflector to assist in identifying the retroreflector. The bidirectional transmitter may be wireless or optical and is part of a complex target staff that includes the retroreflector, transmitter, and control unit. An exemplary system of this type is described in U.S. Pat. No. 5,828,057 to Hertzman et al. Such a method is not suitable for use with a laser tracker, where it is advantageous to use a small target not tethered to a large control pad. Also the method of identifying the retroreflector target of interest is complicated and expensive.

There is a need for a simple method for an operator to communicate commands to a laser tracker from a distance. It is desirable that the method be: (1) useable without a second operator; (2) useable over the entire range of the laser tracker; (3) useable without additional hardware interfacing; (4) functional in all locations; (5) free of service provider fees; (6) free of security restrictions; (7) easy to use without additional setup or programming; (8) capable of initiating a wide range of simple and complex tracker commands; (9) useable to call a tracker to a particular target among a plurality of targets; and (10) useable with a minimum of additional equipment for the operator to carry.

SUMMARY

According to an embodiment of the invention, a three-dimensional (3D) coordinate measurement system includes: a retroreflector; a laser tracker including: a first light source; a second light source; at least one camera proximate the second light source; and a processor responsive to executable instructions which when executed by the processor is operable to: in a first instance, determine that a follow-operator command has been given by an operator and in response turn the laser tracker to follow movement of the operator; and in a second instance, determine that a lock-on command has been given by the operator and in response, steer a beam of light from the first light source onto the retroreflector.

According to another embodiment of the invention, a method for measuring three-dimensional (3D) coordinates includes: providing a retroreflector and a laser tracker, the laser tracker including a first light source, a second light source, at least one camera proximate the second light source, and a processor; in a first instance: giving by an operator a follow-operator command; responding with the processor, executing executable instructions, to the follow-operator command by turning the laser tracker to follow movement of the operator; in a second instance: giving by the operator a lock-on command; responding with the processor, executing executable instructions, to the lock-on command by steering a beam of light from the first light source onto the retroreflector.

BRIEF DESCRIPTION OF THE DRAWINGS

Referring now to the drawings, wherein like elements are numbered alike in the several FIGURES:

FIGS. 3A-3E illustrate ways in which a passive target can be used to convey gestural information through the tracking and measuring systems of the laser tracker;

FIGS. 5A-5D illustrate ways in which an active target can be used to convey gestural information through the camera system of a laser tracker;

FIGS. 8-10 show a selection of laser tracker commands and corresponding gestures that might be used by the operator to convey these commands to the laser tracker;

FIGS. 28B and 28C show front and perspective views of the exemplary retroreflector illustrated in FIG. 28A;

FIG. 29A shows the laser tracker being rotated to follow the operator in response to having received the follow-operator command;

FIG. 30 shows the operator giving an alternative lock-on gesture based on a position of the operator's arm relative to his torso and, in response, the laser tracker locking onto the retroreflector.

DETAILED DESCRIPTION OF THE PREFERRED EMBODIMENTS

Figure 1:
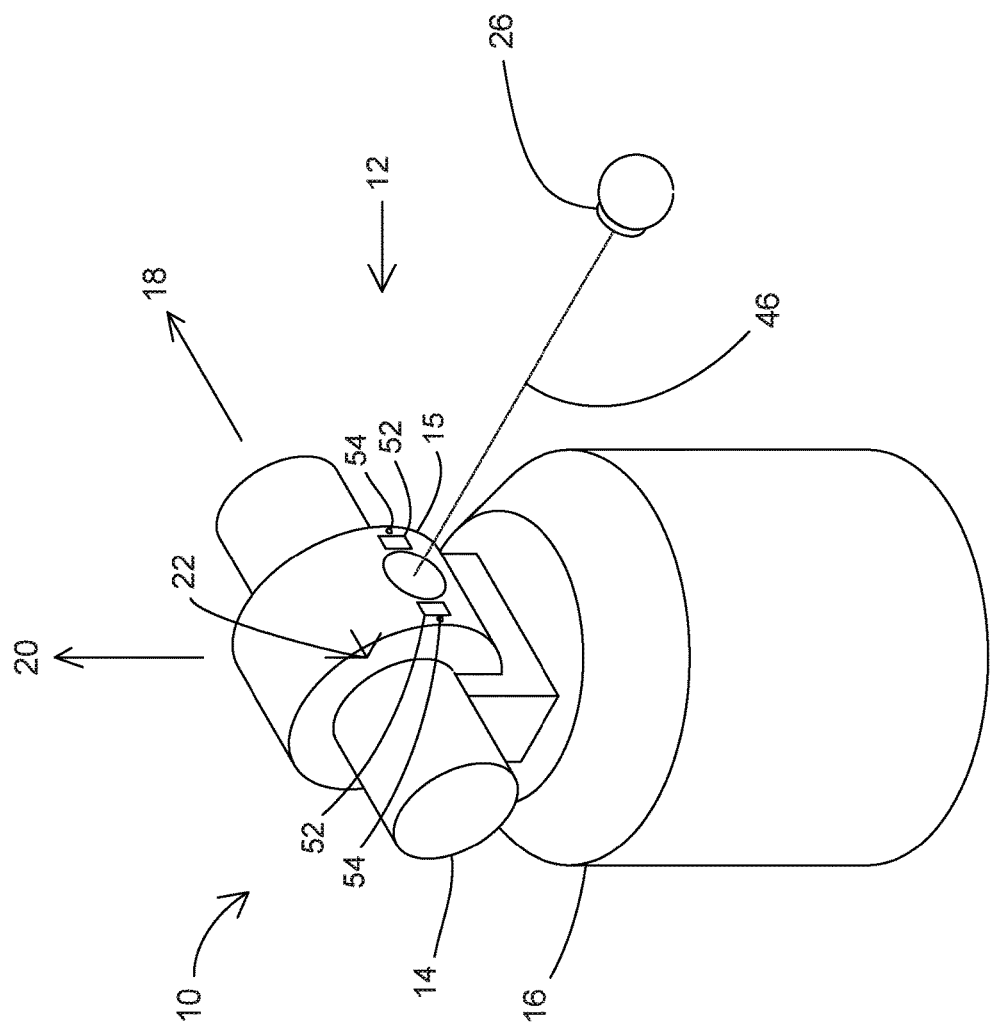
FIG. 1 shows a perspective view of an exemplary laser tracker.

An exemplary laser tracker 10 is illustrated in FIG. 1. An exemplary gimbaled beam-steering mechanism 12 of laser tracker 10 comprises zenith carriage 14 mounted on azimuth base 16 and rotated about azimuth axis 20. Payload 15 is mounted on zenith carriage 14 and rotated about zenith axis 18. Zenith mechanical rotation axis 18 and azimuth mechanical rotation axis 20 intersect orthogonally, internally to tracker 10, at gimbal point 22, which is typically the origin for distance measurements. Laser beam 46 virtually passes through gimbal point 22 and is pointed orthogonal to zenith axis 18. In other words, laser beam 46 is in the plane normal to zenith axis 18. Laser beam 46 is pointed in the desired direction by motors within the tracker (not shown) that rotate payload 15 about zenith axis 18 and azimuth axis 20. Zenith and azimuth angular encoders, internal to the tracker (not shown), are attached to zenith mechanical axis 18 and azimuth mechanical axis 20 and indicate, to high accuracy, the angles of rotation. Laser beam 46 travels to external retroreflector 26 such as the spherically mounted retroreflector (SMR) described above. By measuring the radial distance between gimbal point 22 and retroreflector 26 and the rotation angles about the zenith and azimuth axes 18, 20, the position of retroreflector 26 is found within the spherical coordinate system of the tracker.

Laser beam 46 may comprise one or more laser wavelengths. For the sake of clarity and simplicity, a steering mechanism of the sort shown in FIG. 1 is assumed in the following discussion. However, other types of steering mechanisms are possible. For example, it would be possible to reflect a laser beam off a mirror rotated about the azimuth and zenith axes. An example of the use of a mirror in this way is given in U.S. Pat. No. 4,714,339 to Lau et al. The techniques described here are applicable, regardless of the type of steering mechanism.

In exemplary laser tracker 10, cameras 52 and light sources 54 are located on payload 15. Light sources 54 illuminate one or more retroreflector targets 26. Light sources 54 may be LEDs electrically driven to repetitively emit pulsed light. Each camera 52 comprises a photosensitive array and a lens placed in front of the photosensitive array. The photosensitive array may be a CMOS or CCD array. The lens may have a relatively wide field of view, say thirty or forty degrees. The purpose of the lens is to form an image on the photosensitive array of objects within the field of view of the lens. Each light source 54 is placed near camera 52 so that light from light source 54 is reflected off each retroreflector target 26 onto camera 52. In this way, retroreflector images are readily distinguished from the background on the photosensitive array as their image spots are brighter than background objects and are pulsed. There may be two cameras 52 and two light sources 54 placed about the line of laser beam 46. By using two cameras in this way, the principle of triangulation can be used to find the three-dimensional coordinates of any SMR within the field of view of the camera. In addition, the three-dimensional coordinates of the SMR can be monitored as the SMR is moved from point to point. A use of two cameras for this purpose is described in U.S. Published Patent Application No. 2010/0128259 to Bridges.

Other arrangements of one or more cameras and light sources are possible. For example, a light source and camera can be coaxial or nearly coaxial with the laser beams emitted by the tracker. In this case, it may be necessary to use optical filtering or similar methods to avoid saturating the photosensitive array of the camera with the laser beam from the tracker.

Another possible arrangement is to use a single camera located on the payload or base of the tracker. A single camera, if located off the optical axis of the laser tracker, provides information about the two angles that define the direction to the retroreflector but not the distance to the retroreflector. In many cases, this information may be sufficient. If the 3D coordinates of the retroreflector are needed when using a single camera, one possibility is to rotate the tracker in the azimuth direction by 180 degrees and then to flip the zenith axis to point back at the retroreflector. In this way, the target can be viewed from two different directions and the 3D position of the retroreflector can be found using triangulation.

Figure 18:
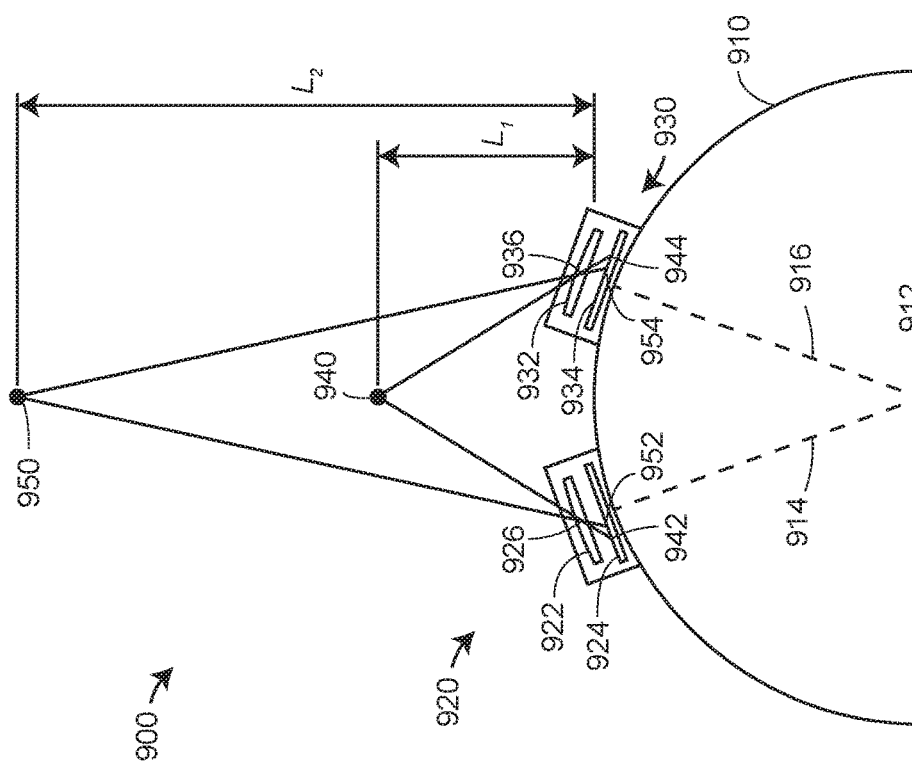
FIG. 18 shows an exemplary geometry that enables finding of three dimensional coordinates of a target using a camera located off the optical axis of a laser tracker.

A more general approach to finding the distance to a retroreflector with a single camera is to rotate the laser tracker about either the azimuth axis or the zenith axis and observe the retroreflector with a camera located on the tracker for each of the two angles of rotation. The retroreflector may be illuminated, for example, by an LED located close to the camera. FIG. 18 shows how this procedure can be used to find the distance to the retroreflector. The test setup 900 includes a laser tracker 910, a camera 920 in a first position, a camera 930 in a second position, and a retroreflector in a first position 940 and a second position 950. The camera is moved from the first position to the second position by rotating the laser tracker 910 about the tracker gimbal point 912 about the azimuth axis, the zenith axis, or both the azimuth axis and the zenith axis. The camera 920 includes a lens system 922 and a photosensitive array 924. The lens system 922 has a perspective center 926 through which rays of light from the retroreflectors 940, 950 pass. The camera 930 is the same as the camera 920 except rotated into a different position. The distance from the surface of the laser tracker 910 to the retroreflector 940 is $L_1$ and the distance from the surface of the laser tracker to the retroreflector 950 is $L_2$. The path from the gimbal point 912 to the perspective center 926 of the lens 922 is drawn along the line 914. The path from the gimbal point 912 to the perspective center 936 of the lens 932 is drawn along the line 916. The distances corresponding to the lines 914 and 916 have the same numerical value. As can be seen from FIG. 18, the nearer position of the retroreflector 940 places an image spot 942 farther from the center of the photosensitive array than the image spot 952 corresponding to the photosensitive array 924 at the distance farther from the laser tracker. This same pattern holds true for the camera 930 located following the rotation (see image spots 944 and 954 on photosensitive array 934, for example). As a result, the distance between the image points of a nearby retroreflector 940 before and after rotation is larger than the distance between the image points of a far-away retroreflector 950 before and after rotation. By rotating the laser tracker and noting the resulting change in position of the image spots on the photosensitive array, the distance to the retroreflector can be found. The method for finding this distance is easily found using trigonometry, as will be obvious to one of ordinary skill in the art.

Another possibility is to switch between measuring and imaging of the target. An example of such a method is described in U.S. Pat. No. 7,800,758 to Bridges et al. Other camera arrangements are possible and can be used with the methods described herein.

Figure 2:
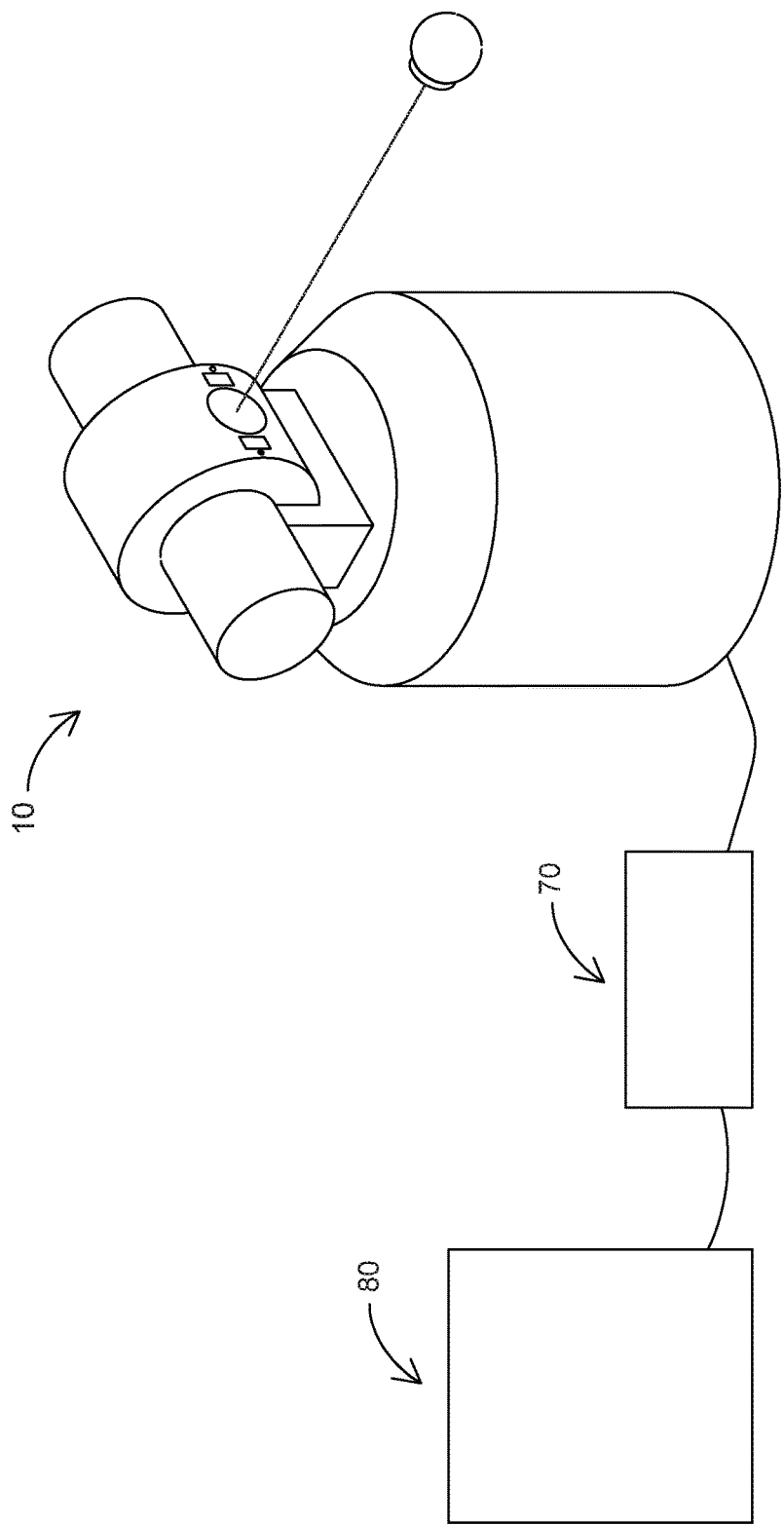
FIG. 2 shows computing and power supply elements attached to exemplary laser tracker.

As shown in FIG. 2, auxiliary unit 70 is usually a part of laser tracker 10. The purpose of auxiliary unit 70 is to supply electrical power to the laser tracker body and in some cases to also supply computing and clocking capability to the system. It is possible to eliminate auxiliary unit 70 altogether by moving the functionality of auxiliary unit 70 into the tracker body. In most cases, auxiliary unit 70 is attached to general purpose computer 80. Application software loaded onto general purpose computer 80 may provide application capabilities such as reverse engineering. It is also possible to eliminate general purpose computer 80 by building its computing capability directly into laser tracker 10. In this case, a user interface, possibly providing keyboard and mouse functionality is built into laser tracker 10. The connection between auxiliary unit 70 and computer 80 may be wireless or through a cable of electrical wires. Computer 80 may be connected to a network, and auxiliary unit 70 may also be connected to a network. Plural instruments, for example, multiple measurement instruments or actuators, may be connected together, either through computer 80 or auxiliary unit 70.

The laser tracker 10 may be rotated on its side, rotated upside down, or placed in an arbitrary orientation. In these situations, the terms azimuth axis and zenith axis have the same direction relative to the laser tracker as the directions shown in FIG. 1 regardless of the orientation of the laser tracker 10.

In another embodiment, the payload 15 is replaced by a mirror that rotates about the azimuth axis 20 and the zenith axis 18. A laser beam is directed upward and strikes the mirror, from which it launches toward a retroreflector 26.

Sending Commands to the Laser Tracker from a Distance

FIGS. 3A-3E, 4A-4C, and 5A-5D demonstrate sensing means by which the operator may communicate gestural patterns that are interpreted and executed as commands by exemplary laser tracker 10. FIGS. 3A-3E demonstrate sensing means by which the operator communicates gestural patterns that exemplary laser tracker 10 interprets using its tracking and measuring systems. FIG. 3A shows laser tracker 10 emitting laser beam 46 intercepted by retroreflector target 26. As target 26 is moved side to side, the laser beam from the tracker follows the movement. At the same time, the angular encoders in tracker 10 measure the angular position of the target in the side-to-side and up-down directions. The angular encoder readings form a two dimensional map of angles that can be recorded by the tracker as a function of time and analyzed to look for patterns of movement.

FIG. 3B shows laser beam 46 tracking retroreflector target 26. In this case, the distance from tracker 10 to target 26 is measured. The ADM or interferometer readings form a one-dimensional map of distances that can be recorded by tracker 10 as a function of time and analyzed to look for patterns of movement. The combined movements of FIGS. 3A and 3B can also be evaluated by laser tracker 10 to look for a pattern in three-dimensional space.

The variations in angle, distance, or three-dimensional space may all be considered as examples of spatial patterns. Spatial patterns are continually observed during routine laser tracker measurements. Within the possible range of observed patterns, some patterns may have associated laser tracker commands. There is one type of spatial pattern in use today that may be considered a command. This pattern is a movement away from the surface of an object following a measurement. For example, if an operator measures a number of points on an object with an SMR to obtain the outer diameter of the object and then moves the SMR away from the surface of the object, it is clear that an outer diameter was being measured. If an operator moves the SMR away from the surface after measuring an inner diameter, it is clear that the inner diameter was being measured. Similarly, if an operator moves an SMR upward after measuring a plate, it is understood that the upper surface of the plate was being measured. It is important to know which side of an object is measured because it is necessary to remove the offset of the SMR, which is the distance from the center to the outer surface of the SMR. If this action of moving the SMR away from an object is automatically interpreted by software associated with the laser tracker measurement, then the movement of the SMR may be considered to be a command that indicates "subtract the SMR offset away from the direction of movement." Therefore, after including this first command in addition to other commands based on the spatial patterns, as described herein, there is a plurality of commands. In other words, there is a correspondence between a plurality of tracker commands and a plurality of spatial patterns.

With all of the discussions in the present application, it should be understood that the concept of a command for a laser tracker is to be taken within the context of the particular measurement. For example, in the above situation in which a movement of the retroreflector was said to indicate whether the retroreflector target was measuring an inner or outer diameter, this statement would only be accurate in the context of a tracker measuring an object having a circular profile.

FIG. 3C shows laser beam 46 tracking retroreflector target 26. In this case, retroreflector target 26 is held fixed, and tracker 10 measures the three-dimensional coordinates. Certain locations within the measurement volume may be assigned special meanings, as for example when a command tablet, described later, is located at a particular three-dimensional position.

FIG. 3D shows laser beam 46 being blocked from reaching retroreflector target 26. By alternately blocking and unblocking laser beam 46, the pattern of optical power returned to tracker 10 is seen by the tracker measurement systems, including the position detector and the distance meters. The variation in this returned pattern forms a pattern as a function of time that can be recorded by the tracker and analyzed to look for patterns.

A pattern in the optical power returned to the laser tracker is often seen during routine measurements. For example, it is common to block a laser beam from reaching a retroreflector and then to recapture the laser beam with the retroreflector at a later time, possibly after moving the retroreflector to a new distance from the tracker. This action of breaking the laser beam and then recapturing the laser beam may be considered to be a simple type of user command that indicates that the retroreflector is to be recaptured after it is moved to a new position. Therefore, after including this first simple command in addition to other commands based on the temporal variation in optical power, as described herein, there is a plurality of commands. In other words, there is a correspondence between a plurality of tracker commands and a plurality of patterns based on variations in optical power received by a sensor disposed on the laser tracker.

A change in optical power is often seen during routine measurements when the laser beam is blocked from returning to the laser tracker. Such an action may be interpreted as a command that indicates "stop tracking" or "stop measuring." Similarly, a retroreflector may be moved to intercept a laser beam. Such simple actions might be interpreted as commands that indicates "start tracking." These simple commands are not of interest in the present patent application. For this reason, commands discussed herein involve changes in optical power that include at least a decrease in optical power followed by an increase in optical power.

FIG. 3E shows laser beam 46 tracking retroreflector 26 with a six degree-of-freedom (DOF) probe 110. Many types of six-DOF probes are possible, and the six-DOF probe 110 shown in FIG. 3E is merely representative, and not limiting in its design. Tracker 10 is able to find the angle of angular tilt of the probe. For example, the tracker may find and record the roll, pitch, and yaw angles of probe 110 as a function of time. The collection of angles can be analyzed to look for patterns.

Figure 4C:
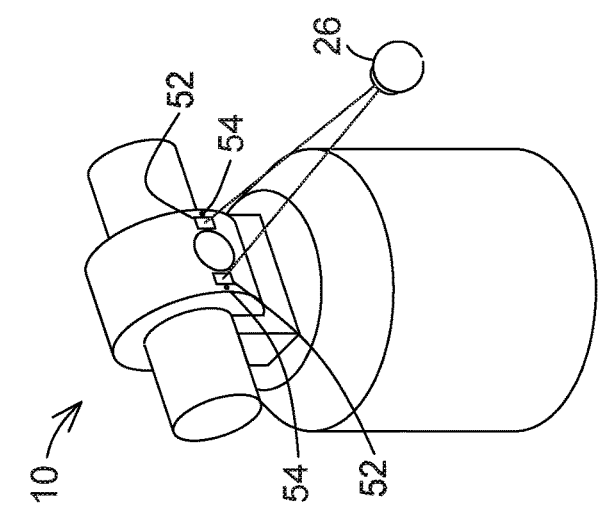
FIGS. 4A-4C illustrate ways in which a passive target can be used to convey gestural information through the camera system of a laser tracker.
Figure 4B:
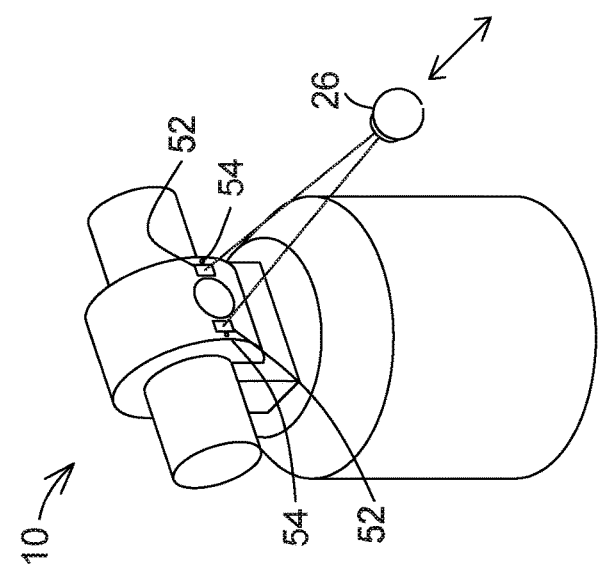
Figure 4A:
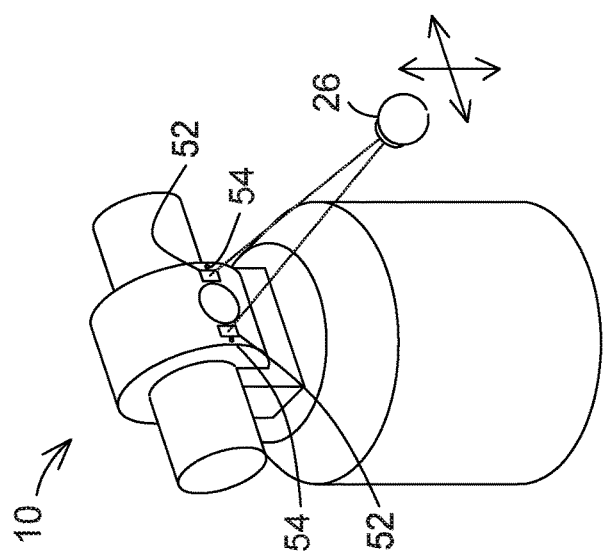

FIGS. 4A-4C demonstrate sensing means by which the operator may communicate gestural patterns that exemplary laser tracker 10 interprets using its camera systems. FIG. 4A shows cameras 52 observing the movement of retroreflector target 26. Cameras 52 record the angular position of target 26 as a function of time. These angles are analyzed later to look for patterns. It is only necessary to have one camera to follow the angular movement of retroreflector target 26, but the second camera enables calculation of the distance to the target. Optional light sources 54 illuminate target 26, thereby making it easier to identify in the midst of background images. In addition, light sources 54 may be pulsed to further simplify target identification.

FIG. 4B shows cameras 52 observing the movement of retroreflector target 26. Cameras 52 record the angular positions of target 26 and, using triangulation, calculate the distance to target 26 as a function of time. These distances are analyzed later to look for patterns. Optional light sources 54 illuminate target 26.

FIG. 4C shows cameras 52 observing the position of retroreflector target 26, which is held fixed. Tracker 10 measures the three-dimensional coordinates of target 26. Certain locations within the measurement volume may be assigned special meanings, as for example when a command tablet, described later, is located at a particular three-dimensional position.

FIGS. 5A-5D demonstrate sensing means by which the operator may communicate gestural patterns that exemplary laser tracker 10 interprets by using its camera systems in combination with an active light source. FIG. 5A shows cameras 52 observing active retroreflector target 120. Active retroreflector target comprises retroreflector target 126 onto which are mounted light source 122 and control button 124 that turns light source 122 on and off. The operator presses control button 124 on and off in a prescribed pattern to illuminate light source 122 in a pattern that is seen by cameras 52 and analyzed by tracker 10.

An alternative mode of operation for FIG. 5A is for the operator to hold down control button 124 only while gesturing a command, which might be given, for example, using side-to-side and up-down movements. By holding down control button 124 only during this time, parsing and analysis is simplified for tracker 10. There are several ways that the tracker can obtain the pattern of movement, whether control button 124 is held down or not: (1) cameras 52 can follow the movement of light source 122; (2) cameras 52 can follow the movement of retroreflector 126, which is optionally illuminated by light sources 54 (see FIG. 4A-4C, for example); or (3) tracking and measurement systems of laser tracker 10 can follow the movement of retroreflector 126. In addition, it is possible for the tracker to follow retroreflector 126 in order to collect measurement data while the operator is at the same time pressing control button 124 up and down to produce a temporal pattern in the emitted LED light to issue a command to the tracker.

FIG. 5B shows cameras 52 observing light source 132 on six DOF probe 130. Six-DOF probe 130 comprises retroreflector 136, light source 132, and control button 134. The operator presses control button 134 on and off in a prescribed manner to illuminate light source 132 in a pattern seen by cameras 54 and analyzed by tracker 10.

An alternative mode of operation for FIG. 5B is for the operator to hold down control button 134 only while gesturing a command, which might be given, for example, using side-to-side and up-down movements or rotations. By holding down control button 134 only during this time, parsing and analysis is simplified for tracker 10. In this case, there are several ways that the tracker can obtain the pattern of movement: (1) cameras 52 can follow the movement of light source 132; (2) cameras 52 can follow the movement of retroreflector 136, which is optionally illuminated by light sources 54 (see FIG. 4A-4C, for example); or (3) tracking and measurement systems of laser tracker 10 can follow the movement or rotation of six-DOF target 130.

Figure 12:
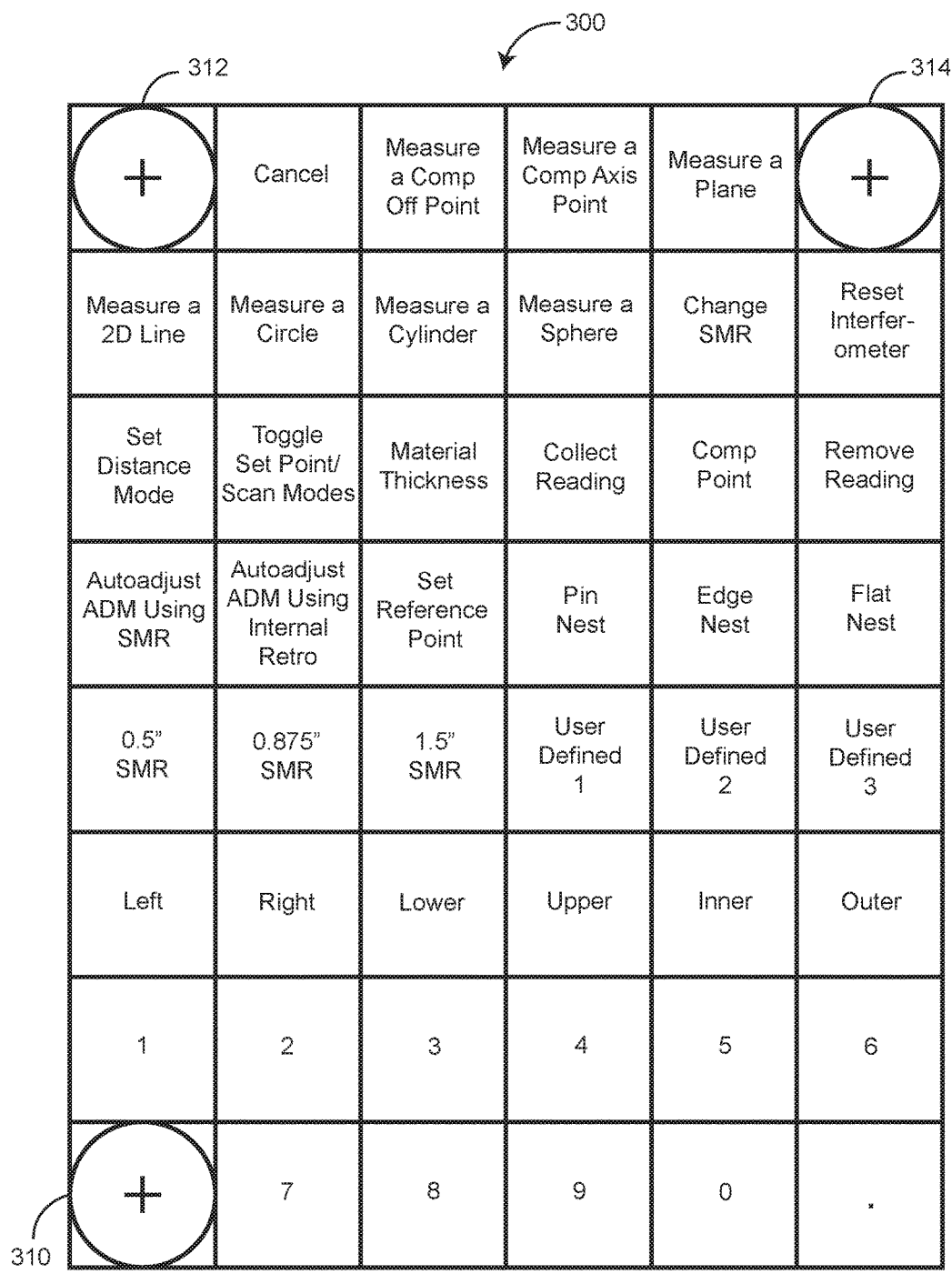
FIG. 12 shows an exemplary command tablet for transmitting commands to a laser tracker by means of gestures.

FIGS. 5A, 5B can also be used to indicate a particular position. For example, a point on the spherical surface of the active retroreflector target 120 or a point on the spherical surface of the six-DOF probe 130 can be held against an object to provide a location that can be determined by the cameras 52. Certain locations within the measurement volume may be assigned special meanings, as for example when a command tablet, described in reference to FIG. 12, is located at a particular three-dimensional position.

FIG. 5C shows cameras 52 observing light source 142 on wand 140. Wand 140 comprises light source 142 and control button 144. The operator presses control button 144 on and off in a prescribed manner to illuminate light source 142 in a temporal pattern seen by cameras 54 and analyzed by tracker 10.

FIG. 5D shows cameras 52 observing light source 142 on wand 140. The operator presses control button 144 on wand 140 to continuously illuminate light source 142. As the operator moves wand 140 in any direction, cameras 52 record the motion of wand 140, the pattern of which is analyzed by tracker 10. It is possible to use a single camera 52 if only the pattern of the transverse (side-to-side, up-down) movement and not the radial movement is important.

As explained above, tracker 10 has the ability to detect spatial positions and temporal patterns created by the operator through the use of retroreflector target 26, six-DOF target 110 or 130, active retroreflector target 120, or wand 140. These spatial or temporal patterns are collectively referred to as gestures. The particular devices and modes of sensing depicted in FIGS. 3A-3E, 4A-4C, 5A-5D are specific examples and should not be understood to limit the scope of the invention.

Figure 6:
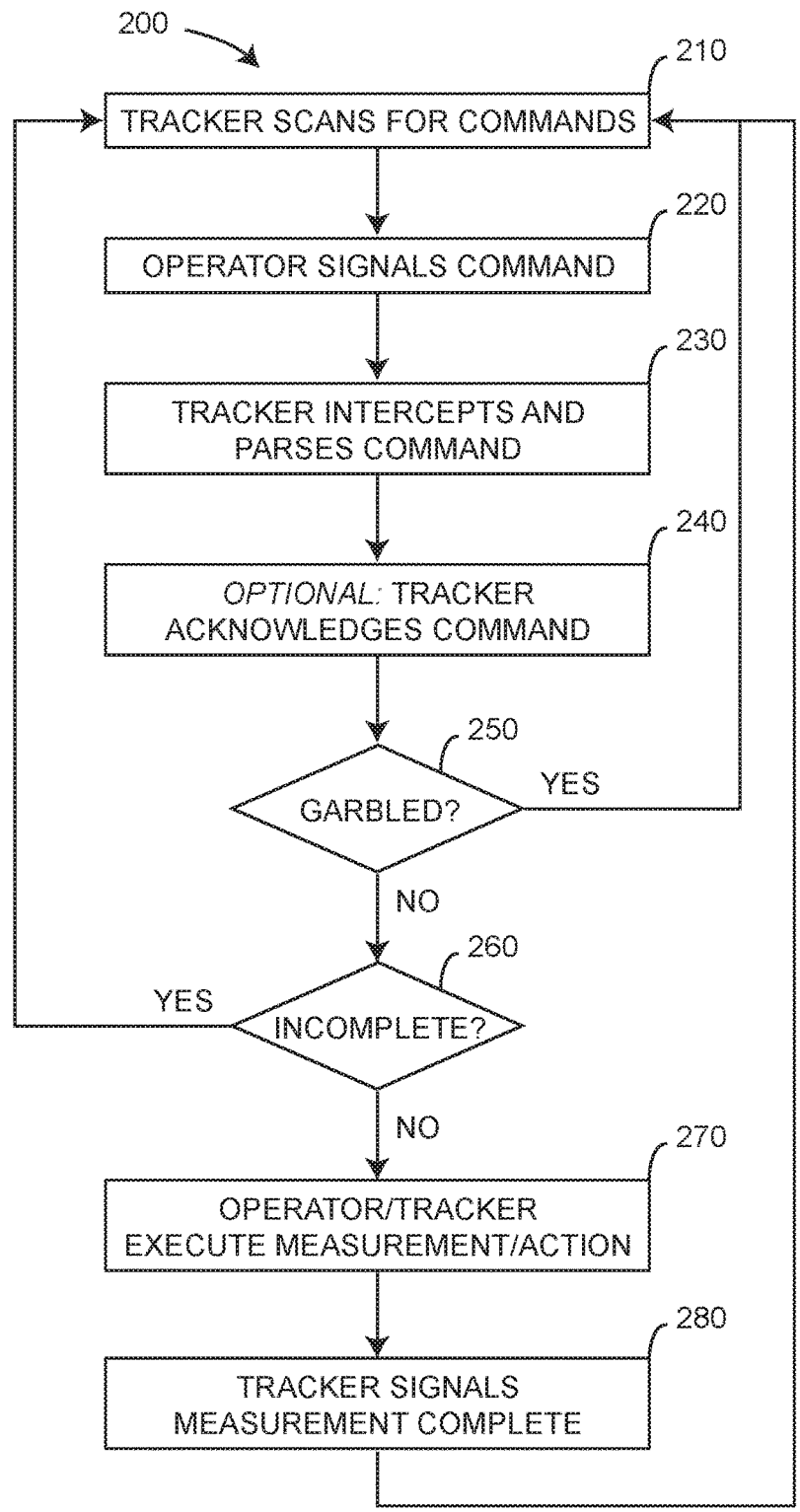
FIG. 6 is a flow chart showing the steps carried out by the operator and laser tracker in issuing and carrying out a gestural command.

FIG. 6 shows flow chart 200, which lists steps carried out by the operator and laser tracker 10 in issuing and carrying out gestural commands. In step 210, laser tracker 10 scans continuously for commands. In other words, the tracker uses one or more of the modes of sensing shown in FIGS. 3A-3E, 4A-4C, 5A-5D to record positions, spatial patterns, and temporal patterns. In step 220, the operator signals a command. This means that the operator creates a gesture by taking a suitable action on an object such as retroreflector target 26, six-DOF target 110 or 130, active retroreflector target 120, or wand 140. An appropriate action might involve movement to a particular absolute coordinate or movement to create a particular spatial or temporal pattern.

In step 230, tracker 10 intercepts and parses the command just signaled by the operator. It intercepts the command by sensing and recording spatial and temporal information from the moving objects. It parses the command by using computing power, possibly within the tracker, to break the stream of data into appropriate subunits and identify the patterns formed by the subunits according to an algorithm. Types of algorithms that might be used are discussed hereinafter.

In step 240, the tracker acknowledges that a command has been received. The acknowledgement might be in the form of a flashing light located on the tracker, for example. The acknowledgement might take several forms depending on whether the command was clearly received, garbled or incomplete, or impossible to carry out for some reason. The signal for each of these different conditions could be given in a variety of different ways. For example, different colors of lights, or different patterns or durations of flashes might be possible. Audible tones could also be used as feedback.

In step 250, tracker 10 checks whether the command is garbled. In other words, is the meaning of the received command unclear? If the command is garbled, the flow returns to step 210, where tracker 10 continues to scan for commands. Otherwise the flow continues to step 260, where tracker 10 checks whether the command is incomplete. In other words, is more information needed to fully define the command? If the command is incomplete, the flow returns to step 210, where tracker 10 continues to scan for commands. Otherwise the flow continues to step 270.

In step 270, tracker 10 executes whatever actions are required by the command. In some cases, the actions require multiple steps both on the part of the tracker and the operator. Examples of such cases are discussed below. In step 280, tracker 10 signals that the measurement is complete. The flow then returns to step 210, where the tracker continues to scan for commands.

Figure 7:
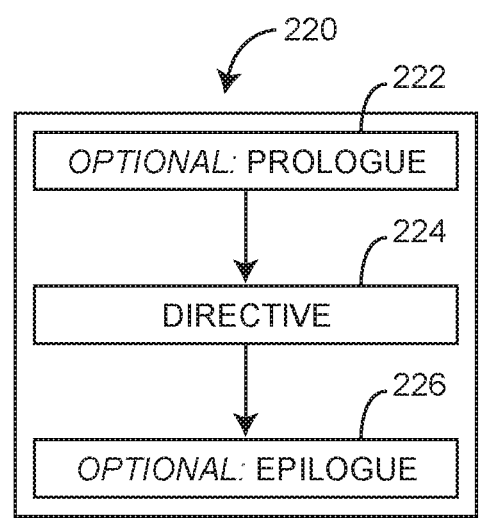
FIG. 7 is a flow chart showing the optional and required parts of a gestural command.

FIG. 7 shows that step 220, in which the operator signals a command, comprises three steps: step 222—prologue, step 224—directive, and step 226—epilogue. The prologue and epilogue steps are optional. The directive part of the command is that part of the command that conveys the instructions to be followed. The prologue part of the command indicates to the tracker that the command is starting and the directive will soon be given. The epilogue part of the command indicates to the tracker that the command is over.

FIGS. 8-10 show two exemplary sets of gestures ("Example 1 gesture" and "Example 2" gesture) that correspond to an exemplary set of commands. The leftmost columns of FIGS. 8-10 show the exemplary set of commands. Some of these commands are taken from FARO CAM2 software. Other commands are taken from other software such as SMX Insight software or the Utilities software shipped with the FARO laser tracker. Besides these examples, commands may be taken from other software or simply created for a particular need. In each of FIGS. 8-10, the second column shows a software shortcut in the CAM2 software, if available. An operator may press this software shortcut on the keyboard to execute the corresponding command. The third and fourth columns of FIGS. 8-10 show some spatial patterns that might be used to represent a certain command. The two dimensional spatial patterns might be sensed using methods shown in FIG. 3A, 4A, or 5D, for example.

For each of the gestures in the third and fourth columns in FIGS. 8-10, the starting position is indicated with a small circle and the ending position is indicated with an arrow. The gestures in the third column of FIGS. 8-10 are simple shapes—circles, triangles, or squares. The 28 shapes shown in this column are distinguished from one another by their orientations and starting positions. In contrast, the shapes in the fourth column of FIGS. 8 and 9 are suggestive of the command to be carried out. The main advantage of the shapes in the third columns is that these are easier for the computer to recognize and interpret as commands. This aspect is discussed in more detail below. The main advantage of the shapes in the fourth columns of FIGS. 8 and 9 is that these may be easier for the operator to remember.

Figure 11:
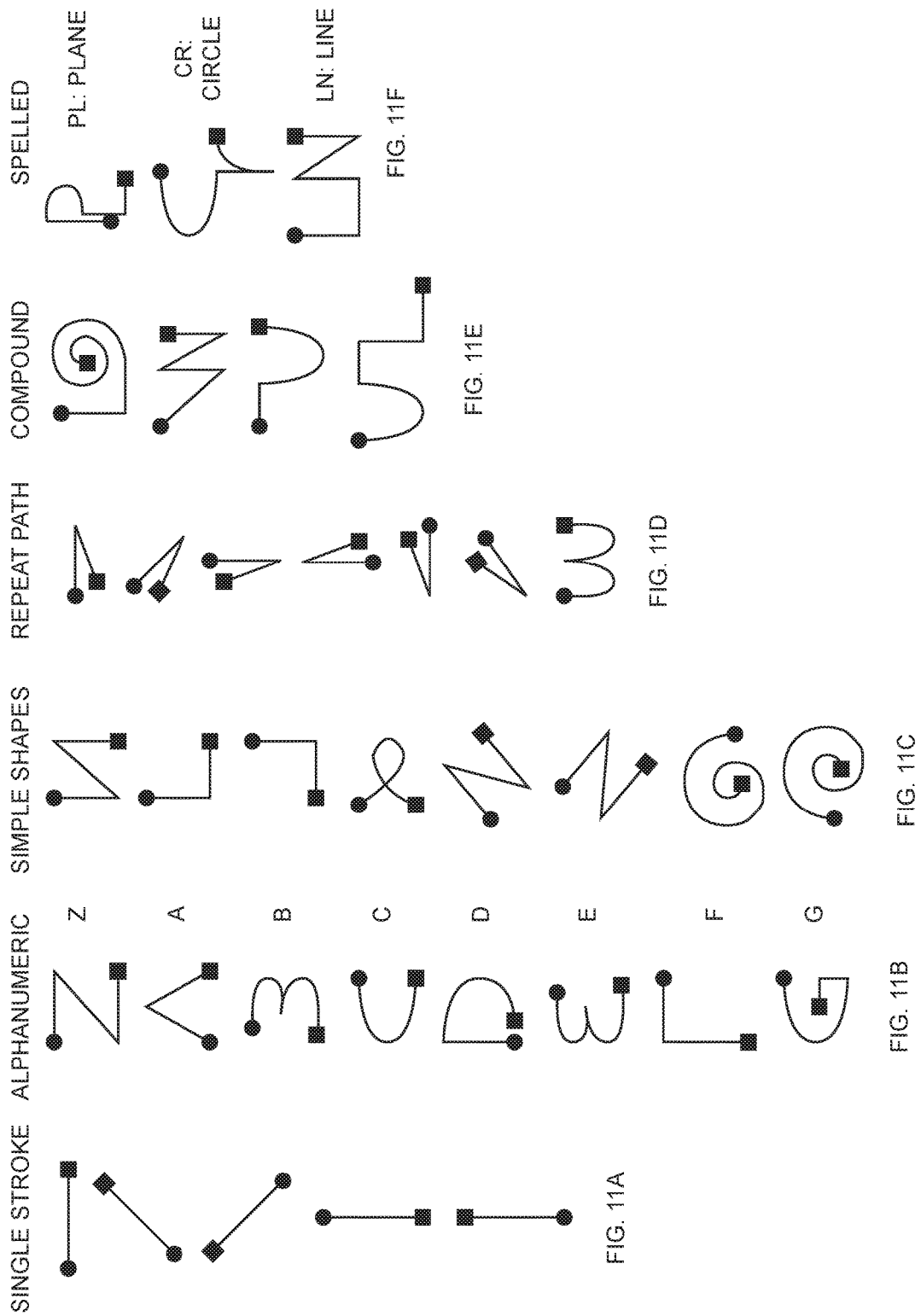
FIGS. 11A-11F show alternative types of gestures that might be used.

FIGS. 11A-11F show some alternative spatial patterns that might be used in gestures. FIG. 11A shows single strokes; FIG. 11B shows alphanumeric characters; FIG. 11C shows simple shapes; FIG. 11D shows a simple path with the path retraced or repeated once; FIG. 11E shows a compound path formed of two or more simpler patterns; and FIG. 11F shows patterns formed of two or more letters.

FIG. 12 shows an exemplary command tablet 300. The operator carries command tablet 300 to a convenient location near the position where the measurement is being made. Command tablet 300 may be made of stiff material having the size of a sheet of notebook paper or larger. The operator places command tablet 300 on a suitable surface and may use a variety of means to hold the target in place. Such means may include tape, magnets, hot glue, tacks, or Velcro. The operator establishes the location of command tablet 300 with the frame of reference of laser tracker 10 by touching fiducial positions 310, 312, and 314 with retroreflector 26. It would be possible to use multiple command tablets in a given environment. An exemplary procedure for finding the command tablet location is discussed below.

Command tablet 300 may be divided into a number of squares. In addition to the squares for fiducial positions 310, 312, and 314, there are squares for commands in FIGS. 8-10, and other squares corresponding to target type, nest type, direction, and number. The layout and contents of exemplary command tablet 300 is merely suggestive, and the command tablet may be effectively designed in a wide variety of ways. A custom command tablet may also be designed for a particular job.

To gesture a command to laser tracker 10, the operator touches the retroreflector to the desired square on command tablet 300. This action by the operator corresponds to step 220 in FIG. 200. Sensing of the action may be carried out by methods shown in FIG. 3C or 4C, for example. If a sequence involving multiple numbers is to be entered—for example, the number 3.50—then the squares 3, point, 5, and 0 would be touched in order. As is discussed below, there are various ways of indicating to the tracker that a square is to be read. One possibility is to wait a preset time—say, for at least two seconds. The tracker will then give a signal, which might be a flashing light, for example, indicating that it has read the contents of the square. When the entire sequence of numbers has been entered, the operator may terminate the sequence in a predetermined way. For example, the agreed upon terminator might be to touch one of the fiducial points.

Command tablet 300 may also be used with an articulated arm CMM instead of a laser tracker. An articulated arm CMM comprises a number of jointed segments attached to a stationary base on one end and a probe, scanner, or sensor on the other end. Exemplary articulated arm CMMs are described in U.S. Pat. No. 6,935,036 to Raab et al., which is incorporated by reference herein, and U.S. Pat. No. 6,965,843 to Raab et al., which is incorporated by reference herein. The probe tip is brought into contact with the squares of command tablet 300 in the same way as the retroreflector target is brought into contact with the squares of command tablet 300 when using a laser tracker. An articulated arm CMM typically makes measurement over a much smaller measurement volume than does a laser tracker. For this reason, it is usually easy to find a convenient place to mount command tablet 300 when using an articulated arm CMM. The particular commands included in command tablet 300 would be adapted to commands appropriate for the articulated arm CMM, which are different than commands for the laser tracker. The advantage of using a command tablet with an articulated arm CMM is that it saves the operator the inconvenience and lost time of setting down the probe, moving to the computer, and entering a command before returning to the articulated arm CMM.

Figure 13:
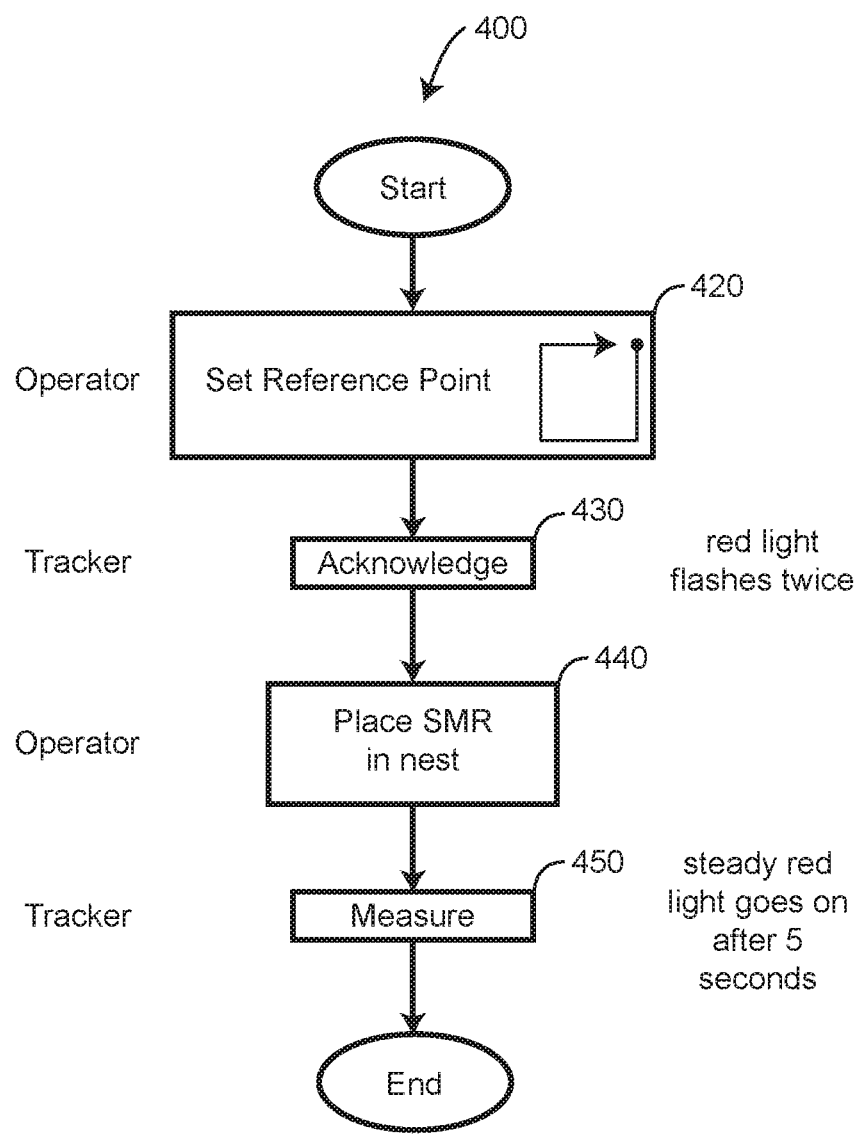
FIG. 13 shows an exemplary method for using gestures to set a tracker reference point.

We now give four examples in FIGS. 13-16 of how gestures may be used. FIG. 13 shows gestures being used to set a reference point for exemplary laser tracker 10. Recall from the earlier discussion that Auto Reset is a possible option mode of a laser tracker. If the laser tracker is set to the Auto Reset option, then whenever the beam path is broken, the laser beam will be directed to the reference position. A popular reference position is the home position of the tracker, which corresponds to the position of a magnetic nest permanently mounted on the body of the laser tracker. Alternatively, a reference point close to the work volume may be chosen to eliminate the need for the operator to walk back to the tracker when the beam is broken. (Usually this capability is most important when the tracker is using an interferometer rather than an ADM to make the measurement.)

In FIG. 13, the actions shown in flow chart 400 are carried out to set a reference point through the use of gestures. In step 420, the operator moves the target in the pattern shown for "Set Reference Point" in FIG. 10. The target in this case may be retroreflector 26, for example, as shown in FIG. 3A. In step 430, laser tracker 10 intercepts and parses the command and acknowledges that the command has been received. In this case, the form of acknowledgement is two flashes of the red light on the tracker front panel. However, other feedback such as a different color or pattern, or an audible tone may be used. In step 440, the operator places SMR 26 into the magnetic nest that defines the reference position. Laser tracker 10 continually monitors position data of SMR 26 and notes when it is stationary. If the SMR is stationary for five seconds, tracker 10 recognizes that the operator has intentionally placed the SMR in the nest, and the tracker begins to measure, via step 450. A red light on the tracker panel, for example, may be illuminated while the measurement is taking place. The red light goes out when the measurement is completed.

Figure 14:
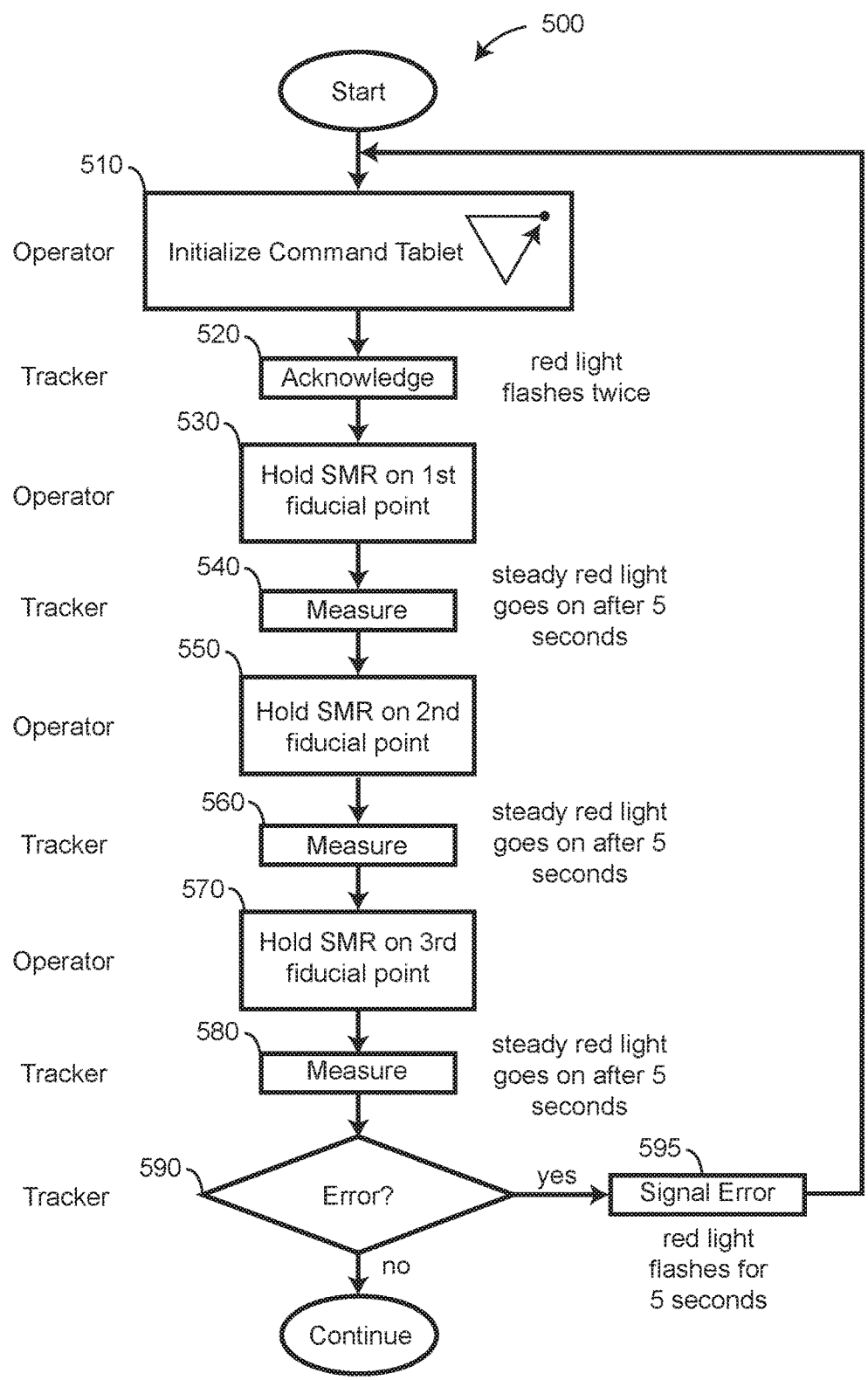
FIG. 14 shows an exemplary method for using gestures to initialize the exemplary command tablet.

In FIG. 14, the actions shown in flow chart 500 are carried out to establish the position of exemplary command tablet 300 in three-dimensional space. Recall from the earlier discussion that command tablet 300 has three fiducial positions 310, 312, and 314. By touching a retroreflector target to these three positions, the position of command tablet 300 in three-dimensional space can be found. In step 510, the operator moves the target in the pattern shown for "Initialize Command Tablet" in FIG. 9. The target in this case may be retroreflector 26, for example, as shown in FIG. 3A. In step 520, laser tracker 10 intercepts and parses the command and acknowledges that the command has been received by flashing the red light twice. In step 530, the operator holds SMR 26 against one of the three fiducial points. Laser tracker 10 continually monitors position data of SMR 26 and notes when the SMR is stationary. In step 540, if SMR 26 is stationary for five seconds, tracker 10 measures the position of SMR 26. In step 550, the operator holds SMR 26 against a second of the three fiducial points. In step 560, if SMR 26 is stationary for five seconds, tracker 10 measures the position of SMR 26. In step 570, the operator holds SMR 26 against the third of the three fiducial points. In step 580, if SMR 26 is stationary for five seconds, tracker 10 measures the position of SMR 26. Now tracker 10 knows the three-dimensional positions of each of the three fiducial points, and it can calculate the distance between these three pairs of points from these three points. In step 590, tracker 10 searches for an error by comparing the known distances between the points to the calculated distances between the points. If the differences are too large, a signal error is indicated in step 595 by a suitable indication, which might be flashing of the red light for five seconds.

Figure 15:
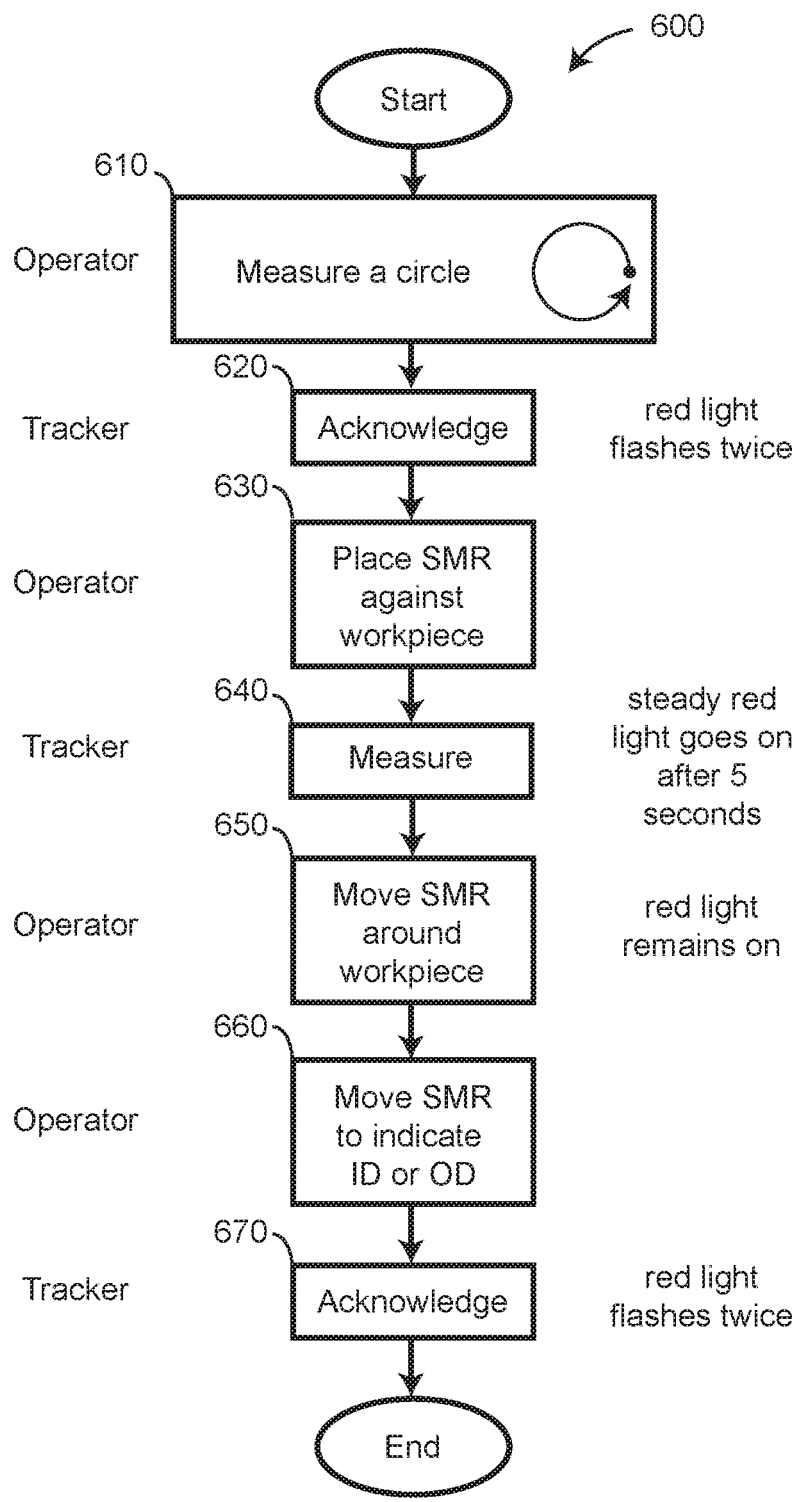
FIG. 15 shows an exemplary method for using gestures to measure a circle.

In FIG. 15, the actions shown in flow chart 600 are carried out to measure a circle through the use of gestures. In step 610, the operator moves the target in the pattern shown for "Measure a Circle" in FIG. 8. The target in this case may be retroreflector 26, for example, as shown in FIG. 3A. In step 620, laser tracker 10 intercepts and parses the command and acknowledges that the command has been received by flashing the red light twice. In step 630, the operator holds retroreflector 26 against the workpiece. For example, if the operator is measuring the inside of a circular hole, he will place the SMR against the part on the inside of the hole. Laser tracker 10 continually monitors position data of retroreflector 26 and notes when the SMR is stationary. In step 640, after retroreflector 26 is stationary for five seconds, the red light comes on and tracker 10 commences continuous measurement of the position of retroreflector 26. In step 650, the operator moves retroreflector 10 along the circle of interest. In step 660, when enough points have been collected, the operator moves retroreflector 26 away from the surface of the object being measured. The movement of retroreflector 26 indicates that the measurement is complete. It also indicates whether retroreflector target 26 is measuring an inner diameter or outer diameter and enables the application software to remove an offset distance to account for the radius of retroreflector 26. In step 670, tracker 10 flashes the red light twice to indicate that the required measurement data has been collected.

Figure 16:
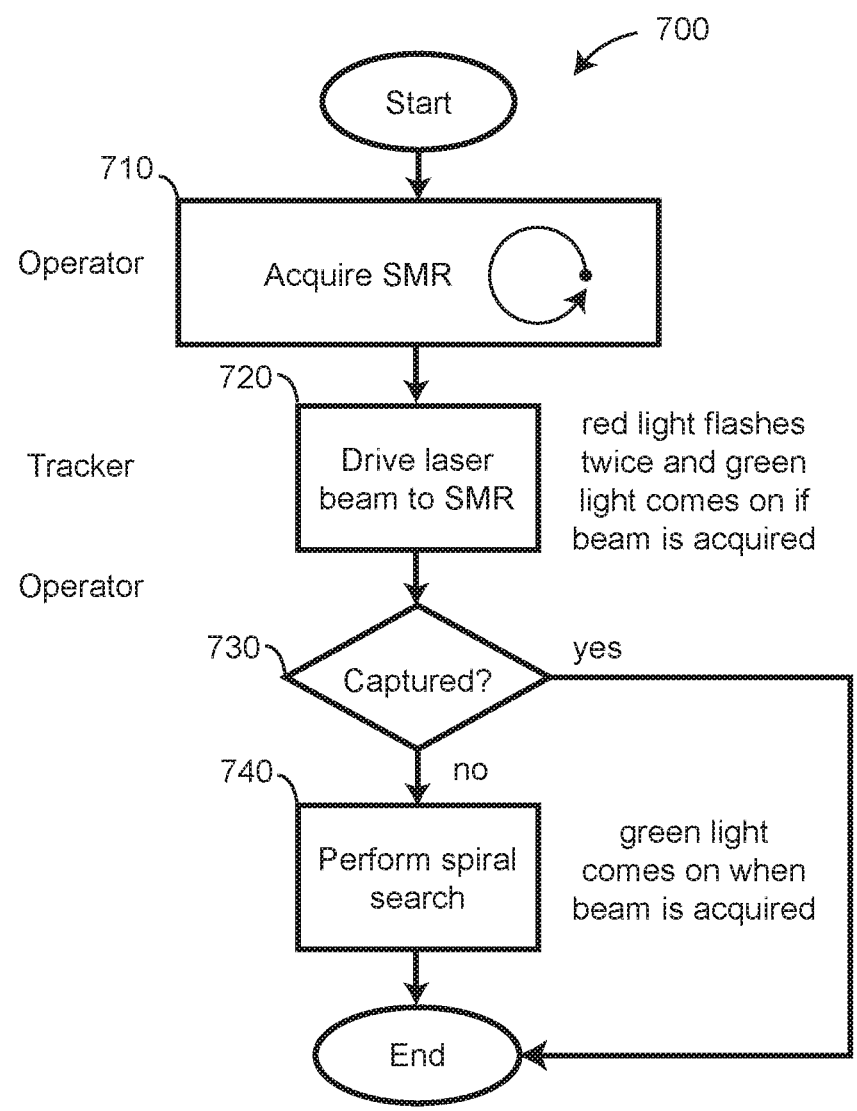
FIG. 16 shows an exemplary method for using gestures to acquire a retroreflector with a laser beam from a laser tracker.

In FIG. 16, the actions shown in flow chart 700 are carried out to acquire a retroreflector after the laser beam from laser tracker 10 has been broken. In step 710, the operator moves the retroreflector in the pattern shown for "Acquire SMR" in FIG. 10. The target in this case may be retroreflector 26, for example, as shown in FIG. 4A. At the beginning of this procedure, the SMR has not acquired the SMR and hence the modes shown in FIGS. 3A-3E cannot be used. Instead cameras 52 and light sources 54 are used to locate retroreflector 26. In step 720, laser tracker 10 intercepts and parses the command and acknowledges that the command has been received by flashing the red light twice. At the same time, it drives the laser beam 46 toward the center of retroreflector 26. In step 730, tracker 10 checks whether the laser beam has been captured by retroreflector 26. In most cases, the laser beam is driven close enough to the center of retroreflector 26 that it lands within the active area of the position detector within the tracker. In this case, the tracker servo system drives the laser beam in a direction that moves the laser beam toward the center of the position detector, which also causes the laser beam to move to the center of retroreflector 26. Normal tracking occurs thereafter. If the laser beam is not driven close enough to the center of retroreflector 26 to land on the position detector within the tracker, then one possibility is to perform a spiral search, as shown in step 740. Laser tracker 10 carries out a spiral search by aiming the laser beam in a starting direction and then directing the beam in an ever widening spiral. Whether or not to perform a spiral search can be set as an option with the laser tracker or the application software used with the laser tracker. Another option, which might be appropriate for a rapidly moving target, is to repeat step 720 repeatedly until the laser beam is captured by the retroreflector or until there is a timeout.

As discussed previously with reference to FIG. 7, the operator signals a command through the use of three steps: an optional prologue, a directive, and an optional epilogue. If tracker 10 is constantly parsing data and can quickly respond when the desired pattern has been produced, then it may be possible to use the directive alone without the prologue or epilogue. Similarly, if the operator touches a position on command tablet 300, the command should be clear to the tracker without the need for a prologue or epilogue. On the other hand, if the tracker cannot parse quickly enough to respond immediately to the patterns created by the operator, or if there is a chance that the operator might create a command pattern unintentionally, then use of a prologue, epilogue, or both may be needed.

An example of a simple prologue or epilogue is simply a pause in the movement of the target, which might be any of the targets shown in FIGS. 3A-3E, 4A-4C, and 5A-5D. For example, the operator may pause for one or two seconds before the start of a pattern and one or two seconds at the end of the pattern. By pausing in this way, the starting and ending positions of each gesture, indicated by circles and arrows, respectively, in FIGS. 8-10 and by circles and squares, respectively, in FIG. 11 will be more easily understood by the parsing software within the tracker or computer.

Another example of a simple prologue or epilogue is rapid blocking and unblocking of the laser beam from the tracker. For example, the operator may splay his fingers so that there is a space between each of the four digits. Then by moving his fingers rapidly across the laser beam, the beam will be broken and unbroken four times in rapid succession. Such a temporal pattern, which might be referred to as the "four finger salute", is readily recognized by the laser tracker. The modes of sensing based on temporal variations in returned laser power are shown in FIG. 3D with a passive target and in FIGS. 5A-5C with active targets.

Besides the use of a prologue or epilogue in the gestural command, a type of prologue is also sometimes needed at the start of an action by the laser tracker. For example, in the examples of FIGS. 13-15, there is a wait of five seconds after a command is given before the tracker measurement is made. The purpose of this wait is to give the operator time to get the retroreflector target into position before beginning the measurement. Of course, the time of five seconds is arbitrary and could be set to any desired value. In addition, it would be possible to use other indicators that the measurement should begin. For example, it would be possible to use a four-finger salute rather than a time delay to indicate readiness for measurement.

Active targets such as those shown in FIGS. 5A-5D are useful in applications such as tool building and device assembly. A tool is a type of apparatus made to assist in the manufacture of other devices. In fields such as automotive and aerospace manufacturing, tools are constructed to exacting specifications. The laser tracker helps both in assembling and in checking such tools. In many cases, it is necessary to align the component elements of a tool with respect to one another. A single retroreflector target, such as retroreflector 26, can be used to establish a coordinate system to which each element in the tool can be properly aligned. In a complicated tool, however, this can involve a lot of iterative measuring. An alternative is to mount multiple retroreflector targets on the tooling elements and then measure all of these in rapid succession. Such rapid measurement is made possible today by modern tracker technologies such as absolute distance meters and camera systems (such as components 52, 54). If multiple retroreflectors are mounted directly on tooling, then it may be difficult or inefficient for an operator to use one of these retroreflectors to create gestural commands. It may be more convenient to use a wand such as 140 shown in FIG. 5C or 5D. The operator can quickly give commands using a wand without disturbing the retroreflectors mounted on the tooling. Such a wand may be mounted on the end of a hammer or similar device to leave the operator's hands free to perform assembly and adjustment. In some cases, a separate retroreflector or six-DOF probe, like those shown in FIGS. 5A and 5B, respectively, may be needed during tool building. By adding a light source and control button to the basic SMR or six-DOF probe, the operator can issue commands in a very flexible way.

Active targets such as those shown in FIGS. 5A-5D are also useful in device assembly. A modern trend is flexible assembly using laser trackers rather than automated tooling assembly. An important advantage of the tracker approach is that little advance preparation is required. One thing that makes such assembly practical today is the availability of software that matches CAD software drawings to measurements made by laser trackers. By placing retroreflectors on the parts to be assembled and then sequentially measuring the retroreflectors with a laser tracker, the closeness of assembly can be shown on a computer display using colors such as red to indicate "far away", yellow to indicate "getting closer", and green to indicate "close enough". Using an active target, the operator can give commands to measure selected targets or groups of targets in ways to optimize the assembly process.

Multiple retroreflectors are often located in a single measurement volume. Examples for tool building and device assembly with multiple retroreflectors were described above. These examples showed that an active target can be particularly useful. In other cases, the ability of the laser tracker to recognize movements of multiple passive retroreflectors can be useful. For example, suppose that multiple retroreflectors have been placed on a tooling fixture such as a sheet metal stamping press and the operator wants to perform a target survey after each operation of the fixture. The survey will sequentially measure the coordinates of each target to check the repeatability of the tooling fixture. An easy way for the operator to set up the initial survey coordinates is to sequentially lift each retroreflector out of its nest and move it around according to a prescribed gestural pattern. When the tracker recognizes the pattern, it measures the coordinates of the retroreflector in its nest. It is the ability of the tracker cameras to recognize gestural patterns over a wide field of view that enables the operator to conveniently switch among retroreflectors.

As mentioned previously, there are several different types of methods or algorithms that can be used to identify gestural patterns and interpret these as commands. Here we suggest a few methods, while recognizing that a wide variety of methods or algorithms could be used and would work equally well. As explained earlier, there are three main types of patterns of interest: (1) single-point absolute position, (2) temporal patterns, and (3) movement patterns. Recognizing single-point absolute position is arguably the easiest of these three categories. In this case, the tracker simply needs to compare measured coordinates to see whether these agree to within a specified tolerance to a coordinate on the surface of command tablet 300.

Temporal patterns are also relatively easy to identify. A particular pattern might consist of a certain number of on-off repetitions, for example, and additional constraints may be placed on the allowable on and off times. In this case, tracker 10 simply needs to record the on and off times and periodically check whether there is a match with a pre-established pattern. It would of course be possible to reduce the power level rather than completely extinguishing the light to send a signal to the tracker. Reduction in the level of retroreflected laser power could be obtained by many means such as using a neutral density filter, polarizer, or iris.

Movement patterns may be parsed in one, two, or three dimensions. A change in radial distance is an example of a one-dimensional movement. A change in transverse (up-down, side-to-side) movement is an example of two-dimensional measurement. A change in radial and transverse dimensions is an example of three-dimensional measurement. Of course, the dimensions of interest are those currently monitored by the laser tracker system. One way to help simplify the parsing and recognition task is to require that it occur within certain bounds of time and space. For example, the pattern may be required to be between 200 mm and 800 mm (eight inches and 32 inches) in extent and to be completed in between one and three seconds. In the case of transverse movements, the tracker will note the movements as changes in angles, and these angles in radians must be multiplied by the distance to the target to get the size of the pattern. By restricting the allowable patterns to certain bounds of time and space, many movements can be eliminated from further consideration as gestural commands. Those that remain may be evaluated in many different ways. For example, data may be temporarily stored in a buffer that is evaluated periodically to see whether a potential match exists to any of the recognized gestural patterns. A special case of a gestural movement pattern that is particularly easy to identify is when the command button 124 in FIG. 5A is pushed to illuminate light 122 to indicate that a gesture is taking place. The computer then simply needs to record the pattern that has taken place when light 122 was illuminated and then evaluate that pattern to see whether a valid gesture has been generated. A similar approach can be taken when the operator presses command button 134 to illuminate light 132 in FIG. 5B or presses command button 144 to illuminate light 142 in FIG. 5D.

Besides these three main patterns, it is also possible to create patterns made using a passive object or a passive object in combination with a retroreflector. For example, the cameras on the tracker might recognize that a particular command is given whenever a passive red square of a certain size is brought within one inch of the SMR.

It would also be possible to combine two of the three main patterns. For example, it would be possible to combine both the speed of movement with a particular spatial pattern, thereby combining pattern types two and three. As another example, the operator may signal a particular command with a saw tooth pattern comprising a rapid movement up, followed by a slow return. Similarly acceleration might be used. For example, a flick motion might be used to "toss" a laser beam away in a particular direction around an object.

Variations are also possible within types of patterns. For example, within the category of spatial patterns, it would be possible to distinguish between small squares (say, three-inches on a side) and large squares (say, 24 inches on a side).

Figure 17:
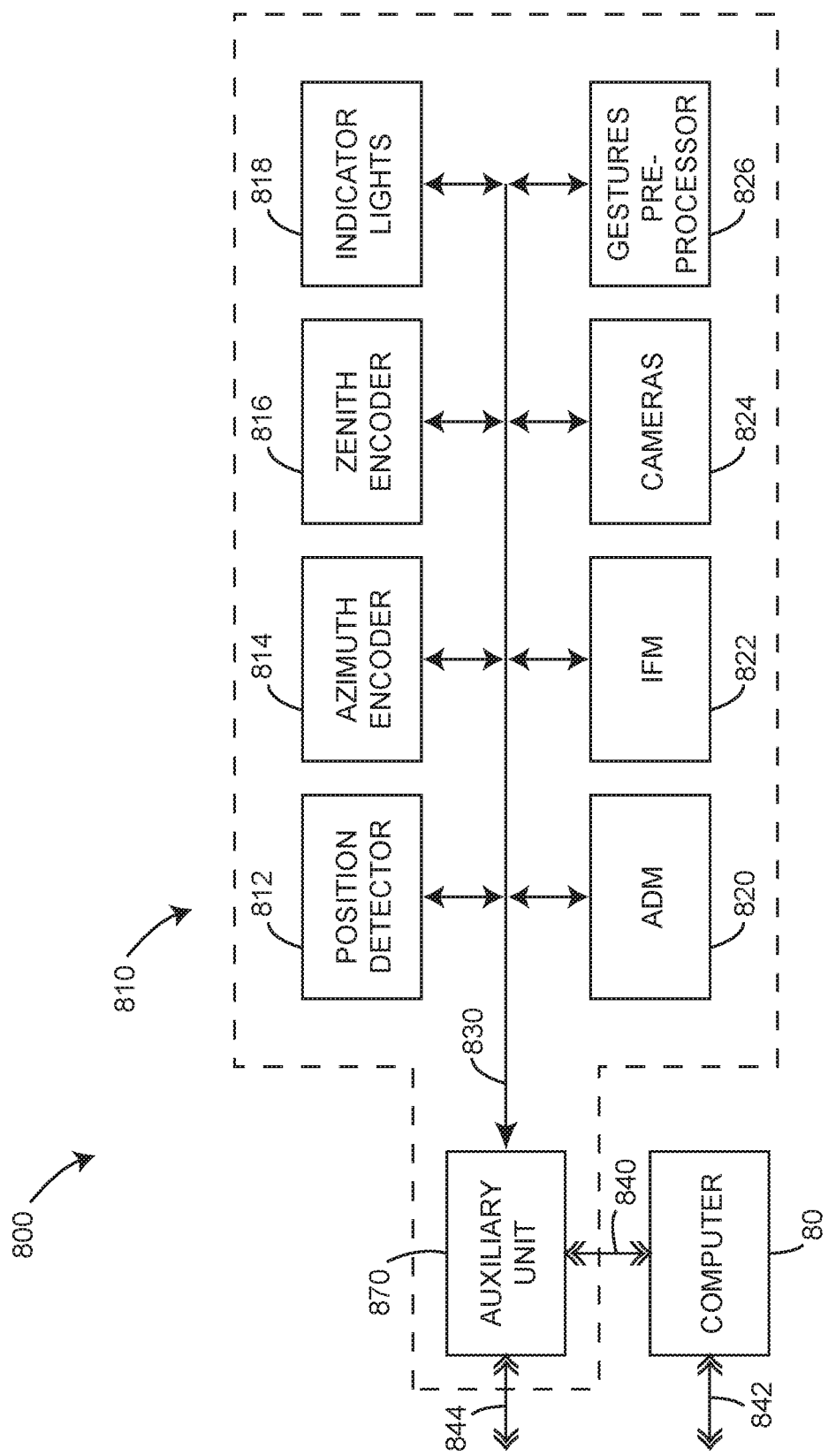
FIG. 17 shows an exemplary electronics and processing system associated with a laser tracker.

The methods of algorithms discussed above are implemented by means of processing system 800 shown in FIG. 17. Processing system 800 comprises tracker processing unit 810 and optionally computer 80. Processing unit 810 includes at least one processor (or processing circuit), which may be a microprocessor, digital signal processor (DSP), field programmable gate array (FPGA), or similar device. Processing capability is provided to process information and issue commands to internal tracker processors. Such processors may include position detector processor 812, azimuth encoder processor 814, zenith encoder processor 816, indicator lights processor 818, ADM processor 820, interferometer (IFM) processor 822, and camera processor 824. It may include gestures preprocessor 826 to assist in evaluating or parsing of gestures patterns. Auxiliary unit processor 870 optionally provides timing and microprocessor support for other processors within tracker processor unit 810. It may communicate with other processors by means of device bus 830, which may transfer information throughout the tracker by means of data packets, as is well known in the art. Computing capability may be distributed throughout tracker processing unit 810, with DSPs and FPGAs performing intermediate calculations on data collected by tracker sensors. The results of these intermediate calculations are returned to auxiliary unit processor 870. As explained previously, auxiliary unit 70 may be attached to the main body of laser tracker 10 through a long cable, or it may be pulled within the main body of the laser tracker so that the tracker attaches directly (and optionally) to computer 80. Auxiliary unit 870 may be connected to computer 80 by connection 840, which may be an Ethernet cable or wireless connection, for example. Auxiliary unit 870 and computer 80 may be connected to the network through connections 842, 844, which may be Ethernet cables or wireless connections, for example.

Preprocessing of sensor data may be evaluated for gestures content by any of processors 812-824, but there may also be a processor 826 specifically designated to carry out gestures preprocessing. Gestures preprocessor 826 may be a microprocessor, DSP, FPGA, or similar device. It may contain a buffer that stores data to be evaluated for gestures content. Preprocessed data may be sent to auxiliary unit for final evaluation, or final evaluation of gestures content may be carried out by gestures preprocessor 826. Alternatively, raw or preprocessed data may be sent to computer 80 for analysis.

Although the use of gestures described above has mostly concentrated on their use with a single laser tracker, it is also beneficial to use gestures with collections of laser trackers or with laser trackers combined with other instruments. One possibility is to designate one laser tracker as the master that then sends commands to other instruments. For example, a set of four laser trackers might be used in a multilateration measurement in which three-dimensional coordinates are calculated using only the distances measured by each tracker. Commands could be given to a single tracker, which would relay commands to the other trackers. Another possibility is to allow multiple instruments to respond to gestures. For example, suppose that a laser tracker were used to relocate an articulated arm CMM. An example of such a system is given in U.S. Pat. No. 7,804,602 to Raab, which is incorporated by reference herein. In this case, the laser tracker might be designated as the master in the relocation procedure. The operator would give gestural commands to the tracker, which would in turn send appropriate commands to the articulated arm CMM. After the relocation procedure was completed, the operator could use a command tablet to give gestural commands to the articulated arm CMM, as described above.

Figure 19:
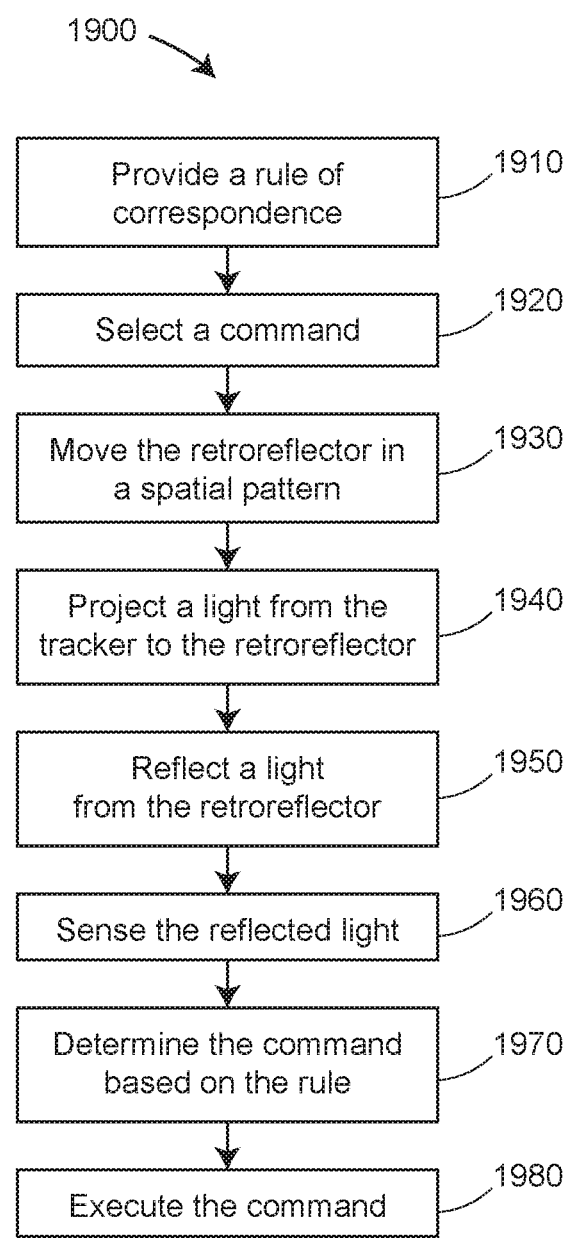
FIG. 19 shows an exemplary method for communicating a command to a laser tracker by gesturing with a retroreflector in a spatial pattern.

FIG. 19 shows steps 1900 that are carried out in giving a gesture to communicate a command to the laser tracker according to the discussions that referenced FIGS. 3A-3B, 4A-4B, and 5A. Step 1910 is to provide a rule of correspondence between commands and spatial patterns. Step 1920 is for the user to select a command from among the possible commands. Step 1930 is for the user to move the retroreflector in a spatial pattern corresponding to the desired command. The spatial pattern might be in transverse or radial directions. Step 1940 is to project a light from the laser tracker to the retroreflector. This light may be a beam of light emitted along the optical axis of the laser tracker or it may be light emitted by an LED near a camera disposed on the laser tracker. Step 1950 is to reflect light from the retroreflector back to the laser tracker. Step 1960 is to sense the reflected light. The sensing may be done by a photosensitive array within a camera disposed on the tracker; by a position detector in the tracker, or by a distance meter within the tracker. Step 1970 is to determine the command based on the rule of correspondence. Step 1980 is to execute the command.

Figure 20:
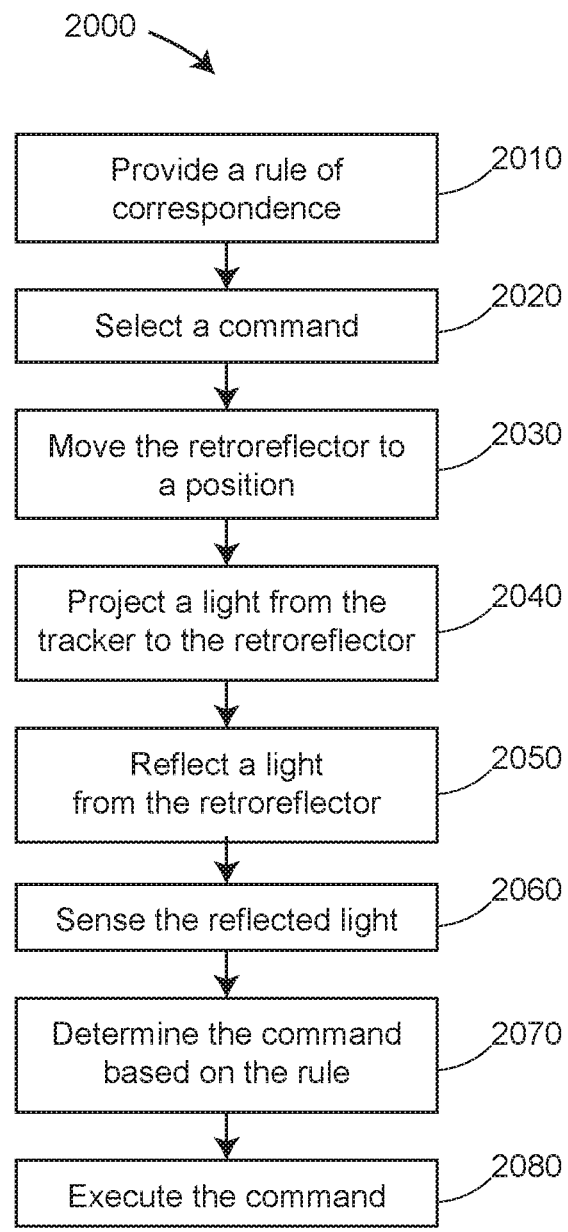
FIG. 20 shows an exemplary method for communicating a command to a laser tracker by indicating a position with a retroreflector.

FIG. 20 shows steps 2000 that are carried out in giving a gesture to communicate a command to the laser tracker according to the discussions that referenced FIGS. 3C, 4C, and 5A. Step 2010 is to provide a rule of correspondence between commands and three-dimensional positions. Step 2020 is for the user to select a command from among the possible commands. Step 2030 is for the user to move the retroreflector to a position corresponding to the desired command, possibly by bringing the retroreflector target in contact with a command tablet. Step 2040 is to project a light from the laser tracker to the retroreflector. This light may be a beam of light emitted along the optical axis of the laser tracker or it may be light emitted by an LED near a camera disposed on the laser tracker. Step 2050 is to reflect light from the retroreflector back to the laser tracker. Step 2060 is to sense the reflected light. The sensing may be done by a photosensitive array within a camera disposed on the tracker; by a position detector in the tracker, or by a distance meter within the tracker. Step 2070 is to determine the command based on the rule of correspondence. Step 2080 is to execute the command.

Figure 21:
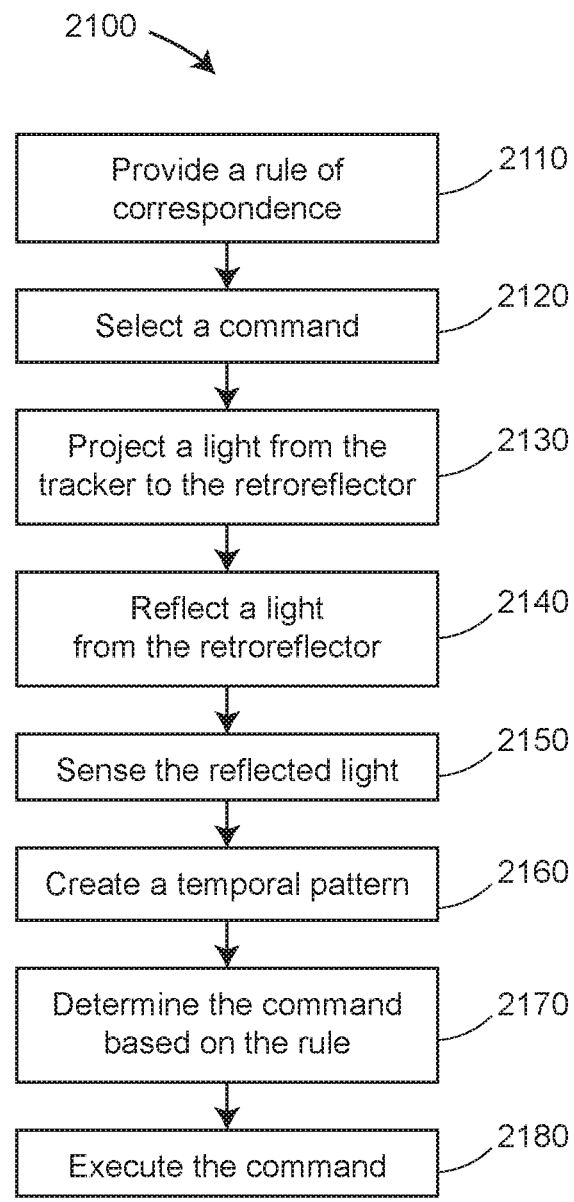
FIG. 21 shows an exemplary method for communicating a command to a laser tracker by gesturing with a retroreflector in a temporal pattern.

FIG. 21 shows steps 2100 that are carried out in giving a gesture to communicate a command to the laser tracker according to the discussions that referenced FIGS. 3D and 5A. Step 2110 is to provide a rule of correspondence between commands and temporal patterns. Step 2120 is for the user to select a command from among the possible commands. Step 2130 is to project a light from the laser tracker to the retroreflector. This light may be a beam of light emitted along the optical axis of the laser tracker or it may be light emitted by an LED near a camera disposed on the laser tracker. Step 2140 is to reflect light from the retroreflector back to the laser tracker. Step 2150 is to sense the reflected light. The sensing may be done by a photosensitive array within a camera disposed on the tracker; by a position detector in the tracker, or by a distance meter within the tracker. Step 2160 is for the user to create a temporal pattern in the optical power received by the sensors on the laser tracker. Such a temporal pattern is easily done by blocking and unblocking a beam of light as discussed hereinbelow. Step 2170 is to determine the command based on the rule of correspondence. Step 2180 is to execute the command.

Figure 22:
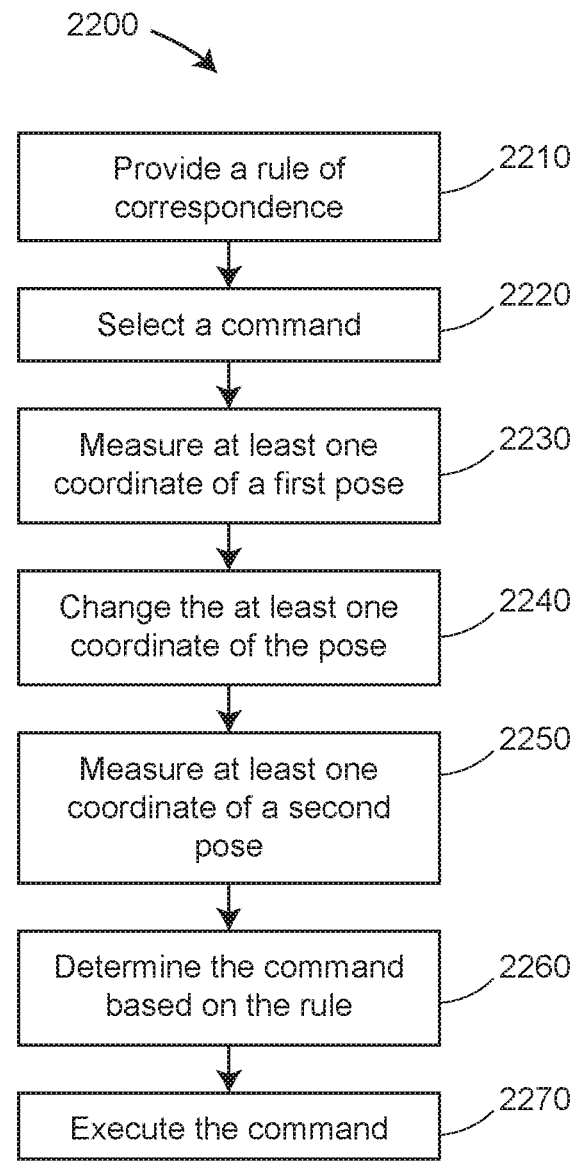
FIG. 22 shows an exemplary method for communicating a command to a laser tracker by measuring a change in the pose of a six DOF target with a six DOF laser tracker.

FIG. 22 shows steps 2200 that are carried out in giving a gesture to communicate a command to a six DOF laser tracker according to the discussions that referenced FIGS. 3E and 5B. Step 2210 is to provide a rule of correspondence between commands and pose of a six DOF target. Step 2220 is for the user to select a command from among the possible commands. Step 2230 is to use the six DOF laser tracker to measure at least one coordinate of a six DOF target in a first pose. A pose includes three translational coordinates (e.g., x, y, z) and three orientational coordinates (e.g., roll, pitch, yaw). Step 2240 is for the user to change at least one of the six dimensions of the pose of the six DOF target. Step 2250 is to measure the at least one coordinate of a second pose, which is the pose that results after the user has completed step 2240. Step 2260 is to determine the command based on the rule of correspondence. Step 2270 is to execute the command.

Figure 23:
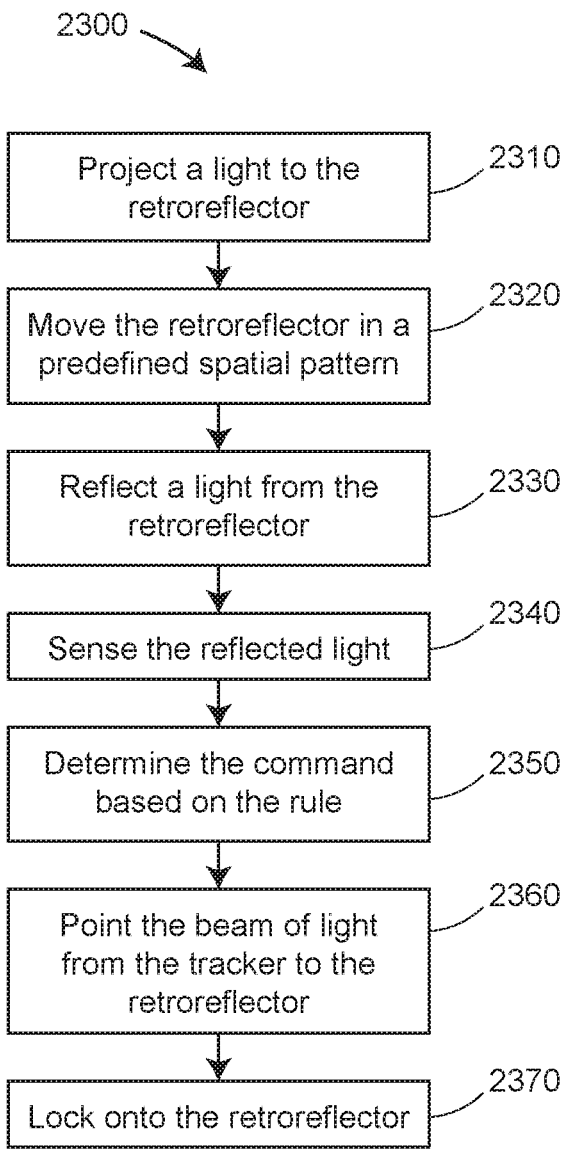
FIG. 23 shows an exemplary method for communicating a command to point the laser beam from the laser tracker to a retroreflector and lock onto the retroreflector, the communication based on a gesture involving a spatial pattern created with the retroreflector.

FIG. 23 shows steps 2300 that are carried out in giving a gesture to communicate a command to the laser tracker to point the laser beam from the laser tracker to the target and lock onto the target. Step 2310 is to project light onto the retroreflector. This light may be light emitted by an LED near a camera disposed on the laser tracker. Step 2320 is for the user to move the retroreflector in a predefined spatial pattern. Step 2330 is to reflect light from the retroreflector to the laser tracker. Step 2340 is to sense the reflected light. The sensing may be done, for example, by a photosensitive array within a camera disposed on the tracker. Step 2350 is to determine the command based on the rule of correspondence. Step 2360 is to point the beam of light from the tracker to the retroreflector. Step 2370 is to lock onto the retroreflector with the laser beam from the tracker.

Figure 24:
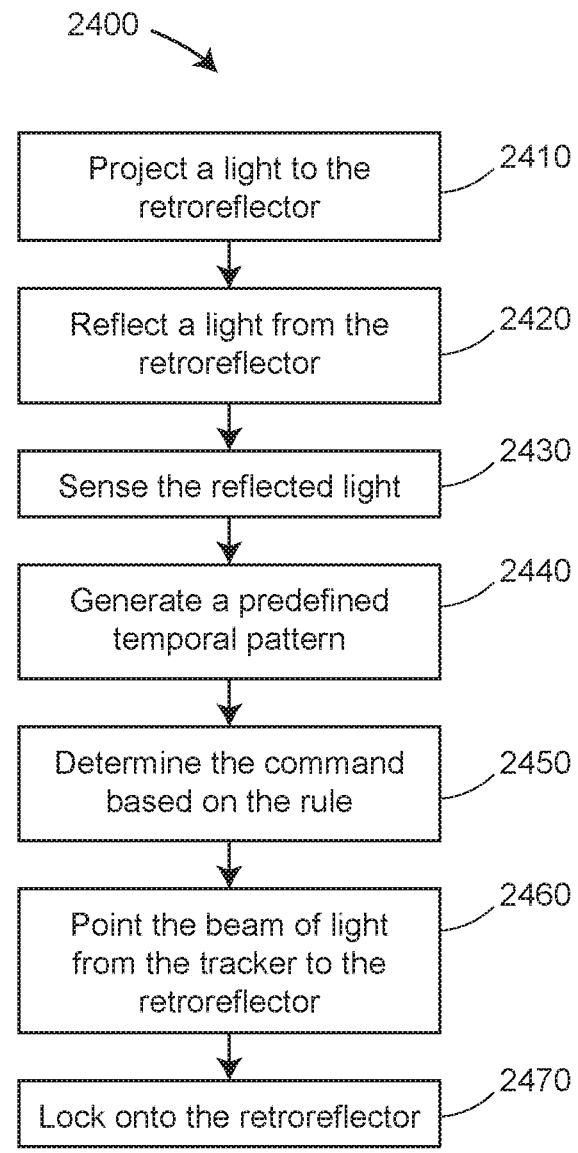
FIG. 24 shows an exemplary method for communicating a command to point the laser beam from the laser tracker to a retroreflector and lock onto the retroreflector, the communication based on a gesture involving a temporal pattern in the optical power received by the laser tracker.

FIG. 24 shows steps 2400 that are carried out in giving a gesture to communicate a command to the laser tracker to point the laser beam from the laser tracker to the target and lock onto the target. Step 2410 is to project light onto the retroreflector. This light may be light emitted by an LED near a camera disposed on the laser tracker. Step 2420 is to reflect light from the retroreflector to the laser tracker. Step 2430 is to sense the reflected light. The sensing may be done, for example, by a photosensitive array within a camera disposed on the tracker. Step 2440 is to generate a predefined temporal pattern, as discussed hereinabove. Step 2450 is to determine the command based on the rule of correspondence. Step 2460 is to point the beam of light from the tracker to the retroreflector. Step 2470 is to lock onto the retroreflector with the laser beam from the tracker.

Figure 25:
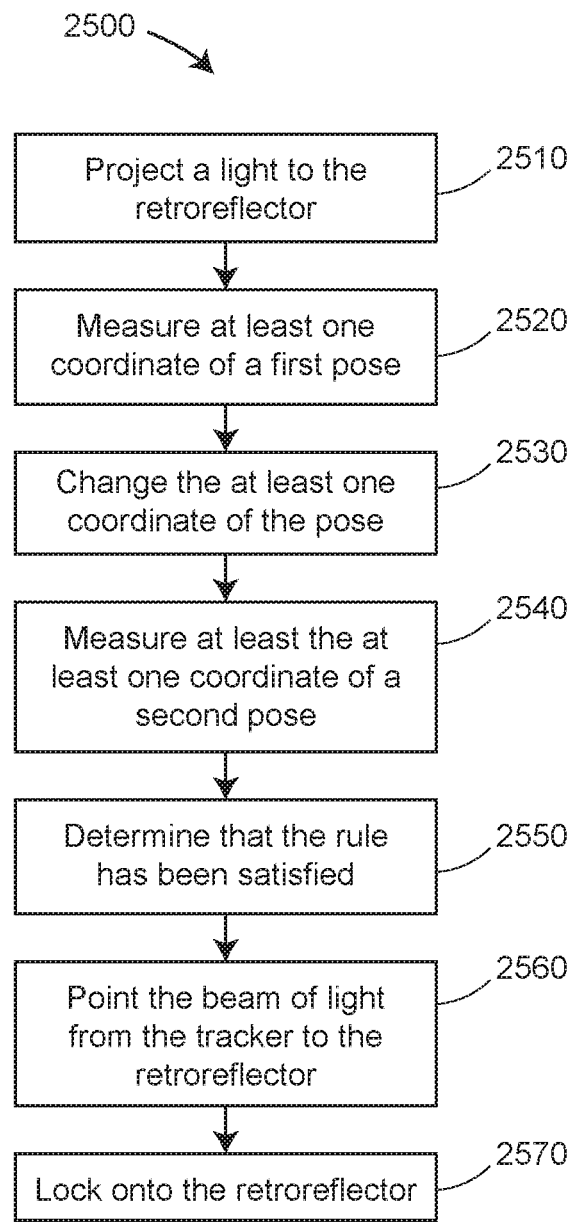
FIG. 25 shows an exemplary method for communicating a command to point the laser beam from the laser tracker to a retroreflector and lock onto the retroreflector, the communication based on a gesture involving a change in the pose of a six DOF probe.

FIG. 25 shows steps 2500 that are carried out in giving a gesture to communicate a command to the laser tracker to point the laser beam from the laser tracker to the target and lock onto the target. Step 2510 is to project light onto the retroreflector. This light may be light emitted by an LED near a camera disposed on the laser tracker. Step 2520 is to measure at least one coordinate of a first pose of a six DOF target. As discussed hereinabove, the pose includes three translational and three orientational degrees of freedom. Step 2530 is to change at least one coordinate of a first pose. Step 2540 is to measure the at least one coordinate of a second pose, which is the pose that results after the at least one coordinate of the six DOF probe has been changed. Step 2550 is to determine the rule of correspondence has been satisfied. Step 2560 is to point the beam of light from the tracker to the retroreflector. Step 2570 is to lock onto the retroreflector with the laser beam from the tracker.

Figure 26:
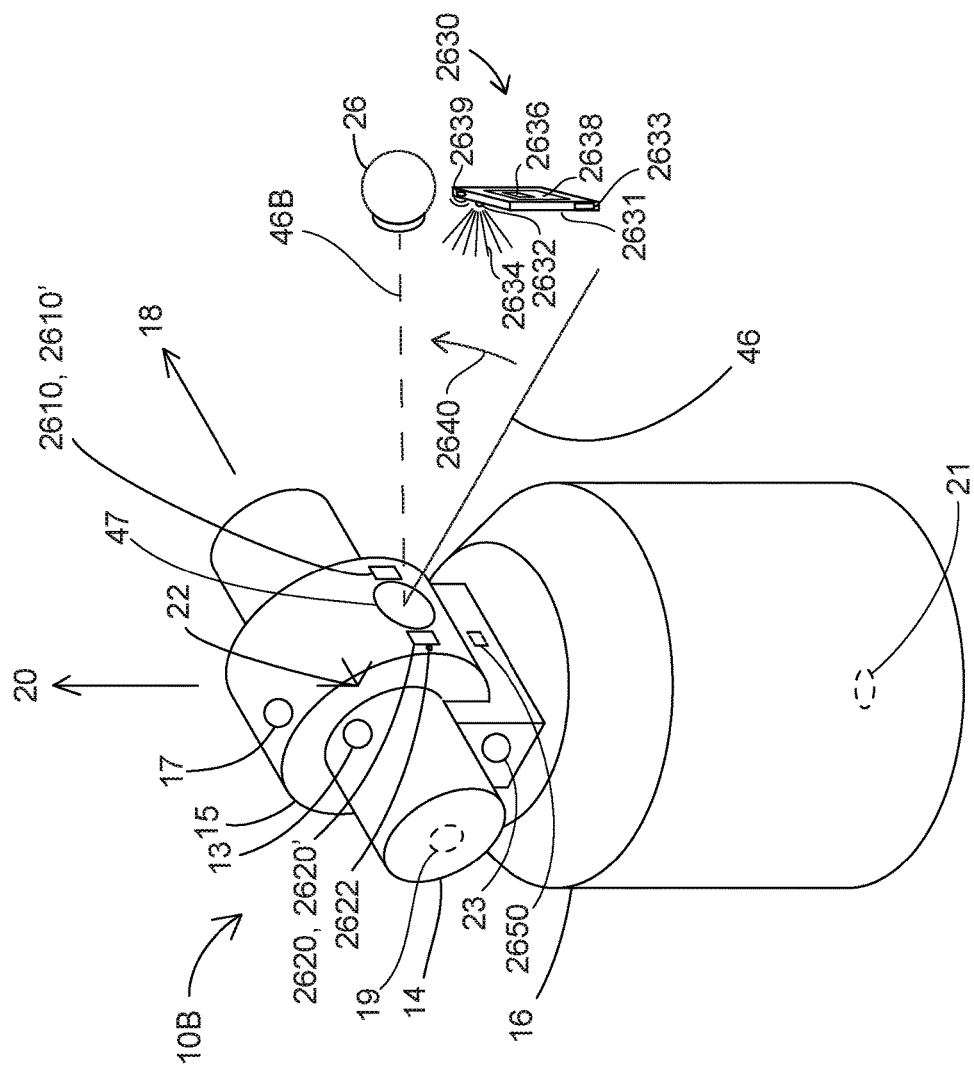
FIG. 26 is a perspective view of a 3D measurement system according to an embodiment.

FIG. 26 shows a laser tracker 10B similar to the laser tracker 10 of FIG. 1 but the cameras 2610, 2620 in FIG. 26 are explicitly described as having different fields of view. In an embodiment, the wide field-of view (FOV) camera 2610 has a wider FOV than the narrow FOV camera 2620. The laser tracker 10B further includes a light source 2622 proximate the entrance aperture of the narrow FOV camera 2620. The light source 2622 is selected to emit light at a wavelength range to which the narrow FOV camera 2620 is sensitive. In an embodiment, wide FOV camera 2610 responds at least to visible wavelengths and narrow FOV camera responds at least to infrared wavelengths. In other embodiments, the cameras 2610, 2620 respond to wavelengths of light in alternative spectral regions.

The term FOV is used here to mean an angular extent viewed by a camera. For example, if the diagonal length of a camera photosensitive array is x, then for a camera lens having a focal length f, the angular FOV may be defined as $2 \arctan(x/2f)$. Of course, other definitions for FOV may be used, the general notion being that the FOV represents an angular extent of a scene that is captured by a camera photosensitive array. In an embodiment, wide FOV camera 2610 has a FOV in the range of 40 to 90 degrees. In another embodiment, the camera 2610 is a fisheye lens having a wider FOV, for example, between 100 and 180 degrees. In an embodiment, the narrow FOV camera 2620 has a FOV between 0.5 degree and 20 degrees. For the small angles of the narrow FOV camera 2620, an approximate linear transverse dimension that may be viewed by the camera can be found by noting that 1 radian is approximately 60 degrees. Then for a distance R from the tracker to an observation point, the transverse linear dimension L observed by the camera is approximately L=R·FOV/60, where the FOV is given in degrees. For example, if the narrow FOV camera 2620 has a FOV of 4 degrees and the tracker is viewing an object point R=15 meters away, the transverse linear distance seen by the photosensitive array of the narrow FOV camera 2620 is approximately (15 m)(4)/60=1 meter. If the photosensitive array of the narrow FOV camera has 1000 pixels along a linear dimension, then the resolution of the narrow FOV camera is on the order of 1 meter/1000=1 mm. In contrast, for a wide FOV camera having a FOV of 60 degrees, the FOV is more accurately found by the formula 2R·tan (60°/2). For example, if the distance from the tracker to the observation point is 15 meters, the transverse length observed by the camera is (2)(15 m n)(tan(60°/2))=17.3 m n. If this dimension is imaged by the photosensitive array of the wide FOV camera 2610 over 1000 pixels, then the resolution of the object point is on the order of 17.3 m/1000=17.3 mm.

In an embodiment, a 3D measurement system includes the laser tracker 10B, a retroreflector 26, and a communication device 2630. Although the retroreflector 26 is shown in the form of an SMR, it is understood that the retroreflector may be in any type of retroreflective target—for example, a stand-alone cube-corner retroreflector or cateye retroreflector, or a retroreflector embedded in a six-DOF target. In an embodiment, the communication device 2630 includes an operator-controlled unit 2631 configured to control emission of light 2634 from the light source 2632. The light source 2632 may be a mostly visible light source, for example, a "flashlight" illuminator found in many smart phones or a light on a remote control unit.

In an embodiment, the light source 2632 is activated when an operator presses an actuator 2636, which may be a touch-screen selection icon on a user interface 2638 of a smart device (e.g., communication device 2630). A smart device is an electronic device that operates to some extent interactively and autonomously. In most cases, a smart device may also be connected to other devices through protocols such as Bluetooth, near-field communication (NFC), Wi-Fi (IEEE 802.11 standard), a cellular communications method (for example, 3G or LTE), or any of a variety of other communication protocols. Examples of smart devices include smart mobile phones, smart tablets, smart laptops, and smart wearables.

In an alternative embodiment, the communication device 2630 is a remote control. An operator-controlled unit (e.g., 2631) of the remote control may include a plurality of tactile keys (e.g., actuator 2636) activated when pressed by the user. These keys serve as actuators 2636 of the operator-controlled unit 2631. The communication device 2630 further includes a light source 2632 activated by pressing one of the tactile keys. In an embodiment, the light source 2632 may be a white-light LED or any other type of light source that illuminates in response to activation of an actuator 2636 by an operator.

Electrical components, which may include a processor, in the operator-controlled unit 2631 send a signal to the light source 2632 in response to activation of the actuator 2636 by the operator. The light source 2632 illuminates in response to activation of the actuator 2636. The emitted light 2634 may be emitted in a variety of patterns, according to different embodiments, for example: (1) for as long as the operator presses the actuator icon; (2) for a predetermined fixed length of time; (3) in a temporal pattern of light emissions corresponding to a command associated with the selected actuator; or (4) in a pattern of illumination until light from the light source 2622 on the tracker 10B is reflected by the retroreflector 26 and received by the narrow FOV camera 2620.

In an embodiment, the communication device 2630, whether a smart device or a remote control, is further configured to communicate with the laser tracker 10B with wireless signals. In an embodiment, the communication device 2630 further includes a battery 2633, which may be a rechargeable battery.

A tracker lock-in command is a command that initiates steering a beam of light 46 from a light source (depicted generally by reference numeral 47) within the tracker 10B. The newly directed light 46B via movement 2640 strikes the retroreflector 26. The light striking the retroreflector 26 is reflected back into the tracker 10B, a portion of the reflected light traveling to a position detector 13 within the tracker 10B and another portion traveling to a distance meter 17. The position detector 13 provides a signal indicative of a location at which the reflected light strikes a surface area of the position detector 13. After the signal is received by the position detector 13, the tracker control system 23 causes the beam of light 46B to remain locked onto the retroreflector 26, even as the retroreflector 26 is moved. The action of the tracker motors to keep the beam of light 46B on the retroreflector 26 is based at least in part on signals provided by the position detector 13.

In an embodiment, pressing by an operator of a designated actuator 2636 causes light 2634 to be emitted from the communication device 2630, which in turn causes a processor (e.g., processing system 800 depicted in FIG. 17) to carry out via executable instructions executed by the processor 800 a series of steps by which to determine whether a lock-in command has been emitted and if so to steer the beam of light 46 from the tracker 10B to be steered to the retroreflector 26 and to lock onto the retroreflector as represented by the beam of light 46B.

The light 2634 emitted from the light source 2632 by the communication device 2630 may provide a bright signal to the wide FOV camera 2610. The high level of light that may be provided can readily be seen by observing light 2634 from a typical flashlight function of a smart phone (e.g., communication device 2630). In most cases, such a light is brighter than surrounding objects, making it easy to locate with the wide FOV camera 2610. In some cases, it may be advantageous to turn the light source 2632 on and off at a fixed repetition frequency, thereby enabling the tracker 10B to locate the light source 2632 from the flashes. In some cases, the wide FOV camera 2610 may be provided with an optical bandpass filter to more clearly show the flashing light. In other cases, the wide FOV camera 2610 may be a color camera having additional functionality besides that of initiating the lock-in sequence, as discussed further hereinbelow. In this case, an option is to select the illumination from subpixels of a particular color. For example, if the light source 2632 emits red wavelengths, then the signal levels of the red subpixels may be evaluated to determine the location of the strongest red emissions.

A processor (e.g., processing system 800) within the tracker 10B determines that a lock-in command has been given based at least in part on a digital image formed on the photosensitive array of the wide FOV camera 2610 (also herein referred to as the first camera), which is indicative of the light source 2632 having been illuminated. As indicated in FIG. 17, the processor 800 may be in an external computer, an interface box attached to the tracker, or in one or more internal processors within the tracker, which may include microprocessors, digital signal processors (DSPs), field programmable gate arrays (FPGAs), or any other type of computing device. The computing device will in general have a certain amount of associated memory to use.

In an embodiment, the processor 800 causes the light source 2622 on the tracker 10B to be illuminated in response to a lock-in signal having been given. The light from the light source 2622 illuminates the retroreflector 26 and is reflected back toward the narrow FOV camera 2620 (also herein referred to as the second camera). If the reflected light is within the FOV of the narrow FOV camera 2620, the processor 800 directs the motors of the tracker 10B to drive the beam of light 46 to intercept the retroreflector 26 as represented by the beam of light 46B.

If the reflected light from the light source 2622 on the tracker 10B is not within the FOV of the narrow FOV camera 2620, the processor 800 uses the information provided by the digital image of the wide FOV camera 2610 in response to the light 2634 from the communication device 2630 to steer the beam of light 46 from the tracker to the retroreflector as a redirected beam of light 46B while at the same time continuing to illuminate the light source 2622 on the tracker 10B. When the reflected light from the light source 2622 on the tracker 10B is seen by the narrow FOV camera 2620, the processor 800 causes steering to be based mainly or entirely on the digital image picked up on the second narrow FOV camera 2620.

In an embodiment, the light 2634 from the light source 2632 of the communication device 2630 continues to be illuminated in some sort of pattern until the reflected light from the light source 2622 on the tracker 10B is picked up by the narrow FOV camera 2620. By continuing to illuminate the light source 2632, for example in a flashing pattern, the processor 800 may be able to more accurately direct the beam of light 46 toward the retroreflector 26 as represented by the beam of light 46B. In an embodiment, the tracker 10B sends a wireless signal from a wireless transceiver 2650 of the laser tracker 10B to a wireless transceiver 2639 of the communication device 2630, the wireless signal indicating whether the narrow FOV camera 2620 has picked up reflected light from light source 2622 on the tracker 10B. In an embodiment the wireless signal is an electromagnetic signal provided at radio frequency (RF), microwave, or millimeter wave regions of the electromagnetic spectrum.

When the beam of light 46B falls on the retroreflector 26, the reflected light from the light source 2622 on the tracker 10B falls somewhere along a line on the photosensitive array, the position on the line determined by the distance from the tracker 10B to the retroreflector 26. This line on the photosensitive array may be determined at the factory and included in memory of the processor 800 to speed up acquisition of the retroreflector 26 as the beam 46 is steered.

In some cases, an operator may want to carry the retroreflector 26 to a location, without returning to the tracker 10B or to a computer console (e.g., computer 80 depicted in FIG. 2), and have the beam of light 46 be steered to the retroreflector 26. In an embodiment, the operator presses the actuator 2636, which causes the light source 2632 to emit light 2634, leading to the processor-directed sequence of events described above. This way of directing the beam of light 46 to the retroreflector 26 is particularly useful when the operator must carry the SMR 26 to a difficult location, for example, up a ladder.

In some cases, an operator may have the beam of light 46 locked onto an SMR 26 in one location with the SMR 26 being held by a magnetic nest. The operator may want to carry a second SMR 26 to a second location, perhaps up a ladder, and have the tracker beam of light 46 find and lock onto the second SMR 26. In an embodiment, the communication device 2630 has actuators 2636 corresponding to two different types of lock-in commands. In a first lock-in command, the beam of light 46B locks onto the SMR 26 closest the light source 2632. In a second lock-in command, the beam of light 46B locks onto the SMR 26 closest to its nearest position as long as the nearest position is within the FOV of the narrow FOV camera 2620.

In an embodiment, the communication device 2630 includes additional actuators 2636 corresponding to additional tracker commands. In an embodiment, one of the tracker commands is a measure command that causes the tracker to determine 3D coordinates of the retroreflector 26 based at least in part on a distance and two angles measured by the tracker 10B. The distance may be measured by a distance meter 17 and first and second angles measured by first 21 and second 19 angular encoders, respectively.

In an embodiment, the processor 800 is configured to show an image from the wide FOV camera 2610 on a display, which may be a display (e.g., user interface 2638) on a smart device (e.g., communication device 2630) held by an operator or on a computer monitor, for example. By selecting a position on the display, for example, with a mouse or other selection device, the operator may initiate a click-to-drive command in which the tracker 10B is directed to go to the indicated position. The click-to-drive command may be set to automatically further lock into the retroreflector 26 nearest the click-to-drive position (if a retroreflector is present).

In an embodiment, the laser tracker 10B may send a wireless message from its wireless transceiver 2650 to the wireless transceiver 2639 of the communication device 2630 when the beam 46 is no longer locked onto the retroreflector 26. The communication device 2630 may respond by giving the operator a warning message, for example, a flashing light or a warning beep. The operator may in turn respond to the warning message by pressing the actuator 2636 corresponding to the lock-in command. Alternatively, the operator may set the communication device 2630 to automatically activate the lock-in sequence starting with flashing the light 2632 when it receives the wireless "lock-is-lost" message from the laser tracker 10B. In another embodiment, in response to receiving the wireless lock-is-lost message from the laser tracker 10B, the wireless device (e.g., communication device 2630) may be set to return a "lock-in-narrow" command to the tracker 10B. This command will not cause the processor 800 to activate the light source 2632 to emit the light 2634 but will instead determine whether the narrow FOV camera 2620 is able to see the reflected light from the light source 2622 on the tracker 10B. If the narrow FOV camera 2620 is able to see the reflected light, the processor 800 causes the beam of light 46 to be steered to lock onto the retroreflector 26 as represented by the beam of light 46B.

Figure 27:
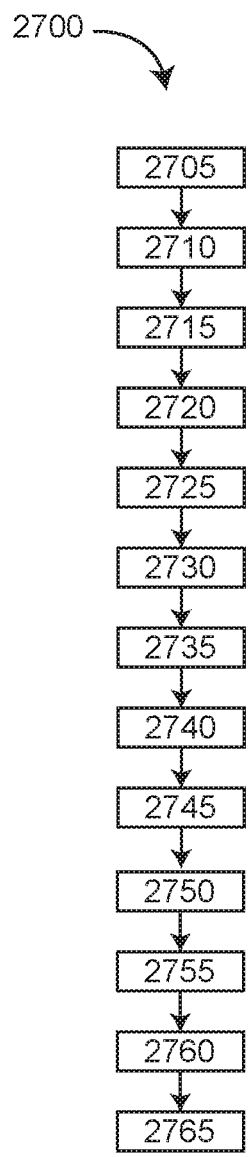
FIG. 27 shows elements of a method for locking onto a retroreflector according to an embodiment.

FIG. 27 shows elements of a method 2700 for locking onto a retroreflector 26 with a laser tracker 10B according to an embodiment. Element 2705 includes providing a communication device 2630, a retroreflector 26, and a laser tracker 10B. The communication device 2630 has a first light source 2632 and an operator-controlled unit 2631 that controls emission of a first light 2634 from the first light source 2632. The retroreflector 26 is separate from the communication device 2630. The laser tracker 10B includes a structure (e.g., azimuth base 16), a distance meter 17, a first angular encoder 21, a second angular encoder 19, a first camera (wide FOV camera) 2610, a second camera (narrow FOV camera) 2620, a second light source 2622, a position detector 13, a processor 800, and a third light source 47. The structure 16 rotates about a first axis 20 and a second axis 18. The second camera 2620, which is proximate the second light source 2622, has a narrower field-of-view than the first camera 2610. The first and the second cameras 2610, 2620 are affixed to an external portion of the structure 16. The position detector is internal to the tracker 10B.

The element 2710 includes emitting the first light 2634 from the communication device 2630. The element 2715 includes capturing the first light 2634 with the first camera (wide FOV camera) 2610 to produce a first digital image (represented generally with reference to numeral 2610'). The element 2720 includes determining by the processor 800, based at least in part on the first digital image 2610', that a lock-in command has been given and in response activating the second light source 2622 (proximate the narrow FOV camera 2620) to produce second light.

The element 2725 includes reflecting from the retroreflector 26 a portion of the second light as second reflected light. The element 2730 includes capturing the second reflected light with the second camera 2620 to produce a second digital image (represented generally with reference to numeral 2620').

The element 2735 includes launching a third light beam 46 from the third light source 47, steering the structure 16 to direct the third light beam 46 to the retroreflector 26, the steering based at least in part on one of the second digital image and a reading of the position detector 13.

The element 2740 includes reflecting a portion of the third light beam 47 as a third reflected light. The element 2745 includes capturing a first part of the third reflected light with the position detector 13. The element 2750 includes capturing a second part of the third reflected light with the distance meter 17.

The element 2755 includes determining with the processor a first distance to the retroreflector 26 based at least in part on the second part of the third reflected light. The step 2760 includes measuring with the first angular encoder 21 a first angle of rotation about the first axis 20. The step 2765 includes measuring with the second angular encoder 19 a second angle of rotation about the second axis 18. The step 2760 includes determining with the processor 800 three-dimensional (3D) coordinates of the retroreflector 26 based at least in part on the first distance, the first angle of rotation, and the second angle of rotation. The step 2765 includes storing the 3D coordinates.

As explained herein above, it is often desirable to lock onto a retroreflector after the retroreflector has been moved a relatively large angular distance from the pointing direction of the laser tracker. In some cases, an operator may want to place the retroreflector in a pocket before moving to a new position, for example, before climbing a ladder. In other cases, an operator may have to pass behind an obstruction such as a pillar before resuming a desired path. In still other cases, the operator may simply want to avoid the effort of keeping the retroreflector pointed back in the direction of the tracker laser beam while walking from one place to another.

Figure 28A:
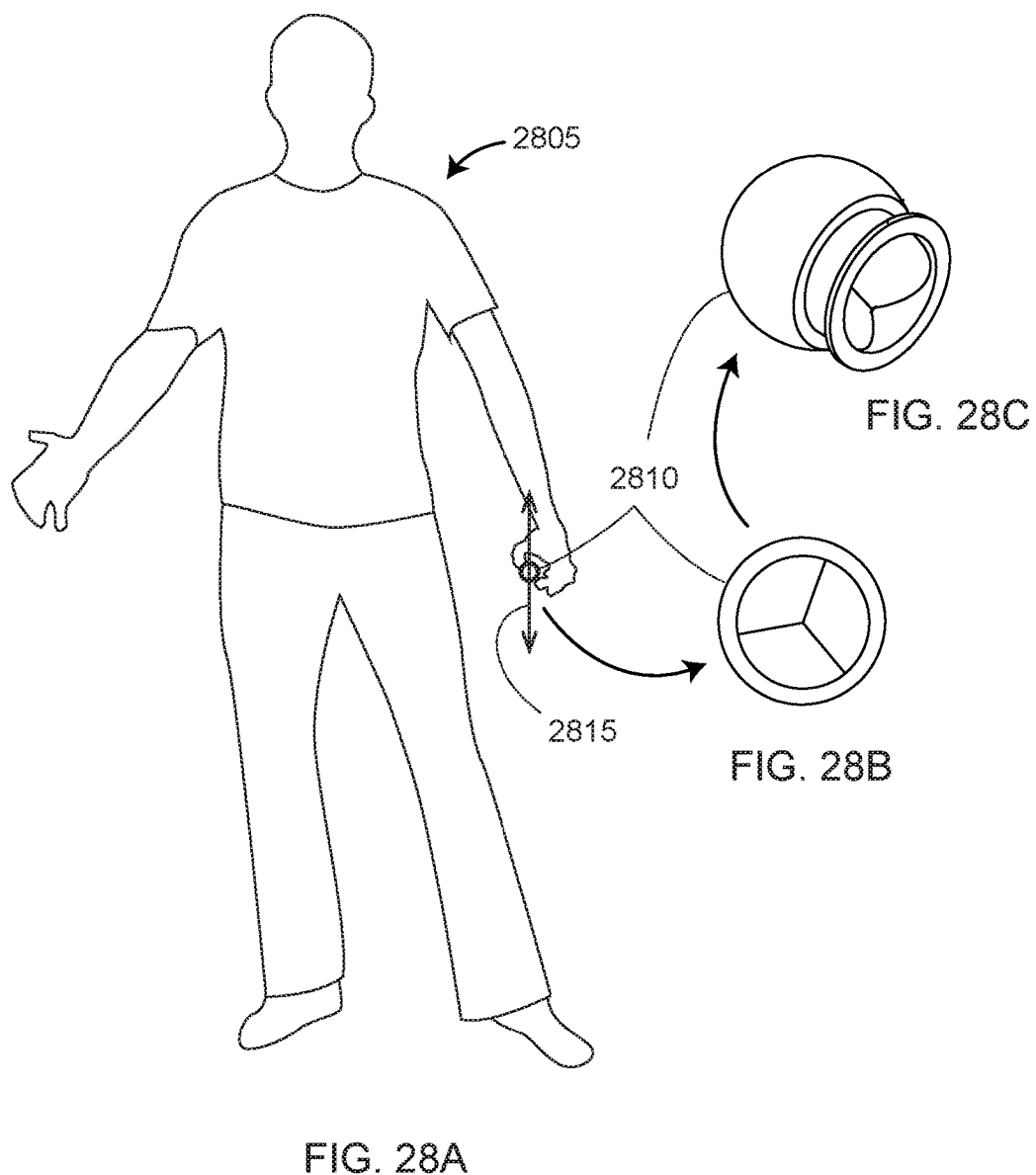
FIG. 28A shows an operator giving an exemplary follow-operator gesture based on a movement pattern of the retroreflector in space.

In embodiments now described in reference to FIGS. 28A-28C, FIGS. 29A-29C, and FIG. 30, the gestural method enables the operator to move from a first position to a second position without staying locked onto the retroreflector. FIG. 28A shows an operator 2805 holding an SMR 2810, which is shown in front view in FIG. 28B and in perspective view in FIG. 28C. In an embodiment, the operator moves the retroreflector in a spatial pattern, which is designated through an established correspondence rule to represent a "follow-operator" command. In an example, the follow-operator command is indicated by an up-down pattern 2815. If the beam of light from the laser tracker is locked onto the retroreflector 2810 when the gesture is performed, the movement pattern (up and down in this case) may be detected by the angular measuring system of the laser tracker. Whether the beam of light is locked on the retroreflector 2810 or not, the retroreflector may be illuminated by a beam of light from a light source 54 on the laser tracker 10, and the illuminated retroreflector captured by one or more cameras 52. Either approach may be used to identify the spatial pattern (up and down in this example) and determine a gestural command based on the spatial pattern. Alternatively, the operator may generate a temporal pattern, resulting in a temporal change in returned light from the retroreflector, using any of the methods described herein above to generate a follow-operator command.

In an embodiment, the follow-operator command generated by the gestural command of FIG. 28A causes the laser tracker to turn its structure, which includes the payload and zenith carriage, to face the operator 2805A along a path 2825A as illustrated in FIG. 29A. In some cases, the direction 2825A may correspond to a path traveled by visible light emitted by the laser tracker, for example, a red laser beam. In other cases, the direction 2825A may follow the operator 2805A without emitting a beam of light. In some cases, the laser tracker 2820 in FIG. 29A may provide an indication that such following is taking place, for example, by flashing a colored light on the tracker in a prescribed pattern that may be recognized by an operator.

In an embodiment, a structure of the tracker 2820 continues to follow the movement 2830 of the operator from a first operator position 2805A to a second operator position 2805B, even if the operator passes behind an obstruction 2840. The operator may be identified by the tracker by a number of different methods. Such identification is important as it enables the tracker structure to continue pointing toward the operator even if the operator position 2805B has changed by a relatively large amount compared to the operator position 2805A. In many cases, the operator may be identified based on operator motion, which may be recognized by the image processing system as being different than the fixed background environment. In many cases, the operator may be identified by operator motion, recognized as distinct from the fixed background. Such recognition may be performed, for example, by image processing software associated with the one or more cameras 52 of the tracker 10 or similar cameras for the tracker 2820. In addition, the operator may be identified based on the general size and shape of the operator using image processing methods known in the art.

Figure 29C:
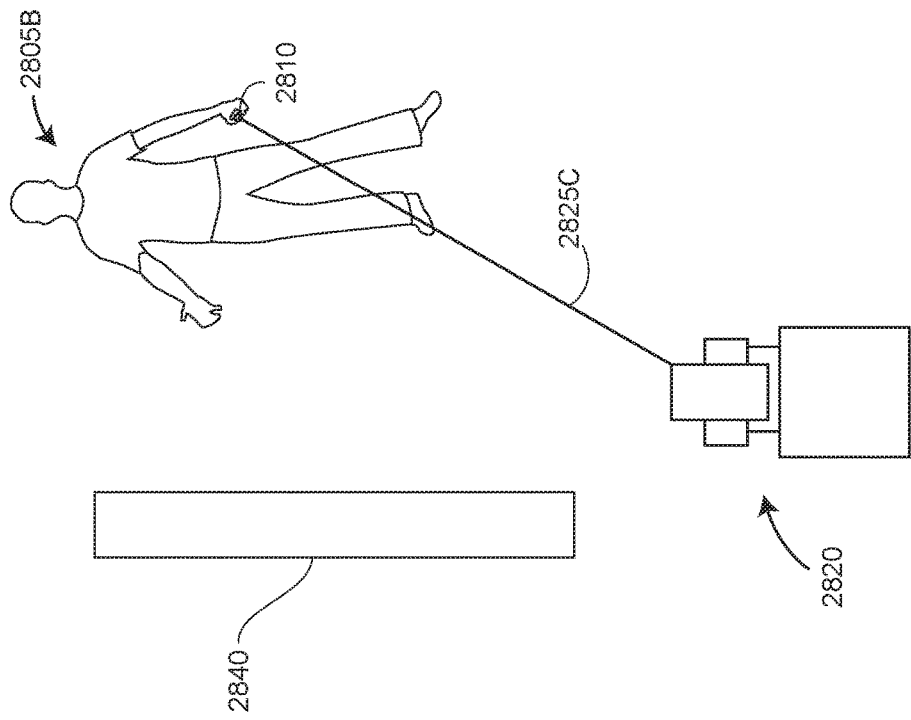
FIG. 29C shows the laser tracker locking onto the retroreflector in response to having received the lock-on gesture.
Figure 29B:
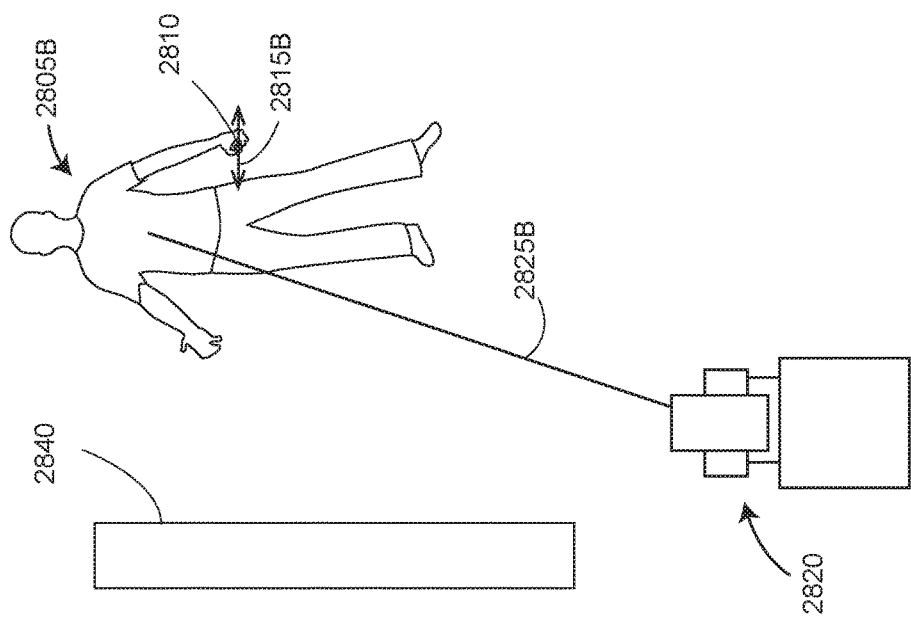
FIG. 29B shows the operator giving an exemplary lock-on gesture based on a movement pattern of the retroreflector in space.

When the operator reaches the desired position 2805B at which he wishes for the laser tracker to again lock onto the retroreflector 2810, as depicted in FIGS. 29B and 29C, he gives a lock-on command, which in an embodiment is a spatial movement gesture 2815B as illustrated in FIG. 29B. In response, the laser tracker 2820 directs the beam of light from the tracker along the direction 2825C to lock onto the retroreflector 2810 as illustrated in FIG. 29C.

In an alternative embodiment, the system that includes the laser tracker monitors the relative posture of the operator to obtain a gestural lock-on command. In an embodiment illustrated in FIG. 30, the gesture is provided by the operator holding an arm 2815C directly to the side of his torso. In an embodiment, such a determination of an operator posture may be made based by representing operator as a stick figure with limb and torso elements modeled as lines. In an embodiment, the gestures preprocessor 826 is responsive to executable instructions which when executed by the gestures preprocessor 826 executes an image analysis algorithm that analyzes an image of the operator 2805 and evaluates or parses gestures patterns performed by the operator 2805.

Once the tracker has determined that a lock-on gesture has been given, the tracker may illuminate one or more lights, such as the lights 54 to obtain an illuminated spot on the one or more cameras 52. As explained herein above, the position of the illuminated spot on the one or more cameras 52 provides the information to enable the tracker to lock in on the retroreflector 2810. Alternatively, in the case of the gestural method of FIG. 30, the lock-on position of the retroreflector is defined to be at the end of the operator's arm 2815C.

From all of the foregoing, it will be appreciated that an embodiment of the invention includes a 3D coordinate measurement system, and a method for measuring 3D coordinates, that includes a retroreflector 2810 and a laser tracker 2820, the laser tracker 2820 having a first light source 47 (see laser tracker 10, FIG. 1) configured to emit a first beam of light 2825A from the laser tracker 2820, a structure 15 rotatable about a first axis 18 and a second axis 20, a second light source 54, a first camera 52 proximate the second light source 54, and a processor 800 responsive to executable instructions which when executed by the processor 800 is operable to: in a first instance, determine that a follow-operator gesture 2815 has been given by an operator 2805, which in an embodiment is performed with the retroreflector 2810 held in a hand of the operator 2805, and in response rotate the structure 15 to follow 2825B movement 2830 of the operator 2805; and in a second instance, determine that a lock-on gesture 2815B has been given by the operator 2805, which in an embodiment is performed with the retroreflector 2810 held in a hand of the operator 2805, and in response, steer 2825C the first beam of light 2825B onto the retroreflector 2810. In an embodiment, the follow-operator gesture 2815 may be a movement of the retroreflector 2810 in space, as depicted in FIG. 28A, or a temporal change in returned light from the retroreflector 2810, as described hereinabove. Similarly, the lock-on gesture 2815B may be a movement of the retroreflector 2810 in space, or a temporal change in returned light from the retroreflector 2810.

In an embodiment, the laser tracker 2820 is configured to illuminate the retroreflector 2810 with the second light source 54 during the follow-operator gesture 2815 and to capture an image of the illuminated retroreflector 2810 via the one or more cameras 52 in response, and in an embodiment is configured to illuminate the retroreflector 2810 during the lock-on gesture 2815B with the second light source 54 and to capture an image of the illuminated retroreflector 2810 via the one or more camera 52 in response.

In an embodiment, the follow-operator gesture 2815, the lock-on gesture 2815B, or both, is (are) based on a position of an arm of the operator 2805 relative to a torso of the operator 2805.

In an embodiment, the processor 800 is responsive to executable instructions which when executed by the processor 800 is operable to, in the second instance, track movement of the retroreflector 2810 with the first beam of light 2825C, and determine 3D coordinates of the retroreflector 2810, following the lock-on gesture 2815B.

While preferred embodiments have been shown and described, various modifications and substitutions may be made thereto without departing from the spirit and scope of the invention. Accordingly, it is to be understood that the present invention has been described by way of illustrations and not limitation.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A three-dimensional (3D) coordinate measurement system, comprising:
   a retroreflector;
   a laser tracker including:
      a first light source;
      a second light source;
      at least one camera proximate the second light source; and
      a processor responsive to executable instructions which when executed by the processor is operable to:
         in a first instance, determine that a follow-operator command has been given by an operator and in response turn the laser tracker to follow movement of the operator; and
         in a second instance, determine that a lock-on command has been given by the operator and in response, steer a beam of light from the first light source onto the retroreflector.

2. The system of claim 1 wherein the follow-operator command is at least one of: a movement of the retroreflector in space; and, a temporal change in returned light from the retroreflector.

3. The system of claim 2 wherein the laser tracker is further configured to illuminate the retroreflector with the second light source during the follow-operator command and to capture an image of the illuminated retroreflector in response.

4. The system of claim 2 wherein the follow-operator command is performed with the retroreflector held in a hand of the operator.

5. The system of claim 1 wherein the lock-on command is at least one of: a movement of the retroreflector in space; and, a temporal change in returned light from the retroreflector.

6. The system of claim 5 wherein the laser tracker is further configured to illuminate the retroreflector during the lock-on command with the second light source and to capture an image of the illuminated retroreflector in response.

7. The system of claim 5 wherein the lock-on command is performed with the retroreflector held in a hand of the operator.

8. The system of claim 1 wherein at least one of the follow-operator command and the lock-on command is based on a position of an arm of the operator relative to a torso of the operator.

9. The system of claim 1 wherein the processor is further responsive to executable instructions which when executed by the processor is operable to, in the second instance, track movement of the retroreflector with the beam of light following the lock-on command.

10. The system of claim 1 wherein the processor is further responsive to executable instructions which when executed by the processor is operable to, in the second instance, determine 3D coordinates of the retroreflector following the lock-on command.

11. A method for measuring three-dimensional (3D) coordinates comprising:
provinding a retroreflector and a laser tracker, the laser tracker including a first light source, a second light source, at least one camera proximate the second light source, and a processor;
in a first instance:
giving by an operator a follow-operator command;
responding with the processor, executing executable instructions, to the follow-operator command by turning the laser tracker to follow movement of the operator;
in a second instance:
giving by the operator a lock-on command;
responding with the processor, executing executable instructions, to the lock-on command by steering a beam of light from the first light source onto the retroreflector.

12. The method of claim 11 wherein, in giving the follow-operator command, the follow-operator command is at least one of: a movement of the retroreflector in space; and, a temporal change in returned light from the retroreflector.

13. The method of claim 12 wherein, during the follow-operator command, the laser tracker illuminates the retroreflector with the second light source and captures an image of the illuminated retroreflector in response.

14. The method of claim 12 wherein the follow-operator command is performed with the retroreflector held in a hand of the operator.

15. The method of claim 11 wherein, in giving by the operator a lock-on command, the lock-on command is at least one of: a movement of the retroreflector in space; and, a temporal change in returned light from the retroreflector.

16. The method of claim 15 wherein, during the lock-on command, the laser tracker illuminates the retroreflector with the second light source and captures an image of the illuminated retroreflector in response.

17. The method of claim 15 wherein, in the second instance, the lock-on command is performed with the retroreflector held in a hand of the operator.

18. The method of claim 11 wherein at least one of the follow-operator command and the lock-on command is based on a position of an arm of the operator relative to a torso of the operator.

19. The method of claim 11 wherein, following the second instance, the laser tracker tracks movement of the retroreflector with the beam of light.

20. The method of claim 11 wherein, following the second instance, the laser tracker determines 3D coordinates of the retroreflector.

* * * * *